United States Patent
Dutta et al.

(10) Patent No.: US 11,460,446 B2
(45) Date of Patent: Oct. 4, 2022

(54) ESTIMATION OF FORMATION AND/OR DOWNHOLE COMPONENT PROPERTIES USING ELECTROMAGNETIC ACOUSTIC SENSING

(71) Applicants: Sushant Dutta, Sugar Land, TX (US); Otto Fanini, Houston, TX (US); Joseph Olaiya, Houston, TX (US); Sandip Maity, Manama (BH); Wei Han, Sugar Land, TX (US); Scott Ingram, The Woodlands, TX (US)

(72) Inventors: Sushant Dutta, Sugar Land, TX (US); Otto Fanini, Houston, TX (US); Joseph Olaiya, Houston, TX (US); Sandip Maity, Manama (BH); Wei Han, Sugar Land, TX (US); Scott Ingram, The Woodlands, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/854,345

(22) Filed: Apr. 21, 2020

(65) Prior Publication Data

US 2021/0325345 A1    Oct. 21, 2021

(51) Int. Cl.
*G01N 29/24* (2006.01)
*G01N 29/11* (2006.01)
(Continued)

(52) U.S. Cl.
CPC ............. *G01N 29/12* (2013.01); *E21B 49/00* (2013.01); *G01N 29/11* (2013.01);
(Continued)

(58) Field of Classification Search
CPC ............... G01N 29/348; G01N 29/312; G01N 29/2437; G01N 29/07; G01N 29/11;
(Continued)

(56) References Cited

U.S. PATENT DOCUMENTS

| 5,461,313 A | 10/1995 | Bohon et al. |
| 6,995,352 B2 * | 2/2006 | Hay ...................... E21B 47/135 |
| | | 250/227.14 |

(Continued)

FOREIGN PATENT DOCUMENTS

| FR | 3068068 | * 12/2018 | ............. E21B 47/00 |
| WO | WO-2016118393 A2 * | 7/2016 | ............. E21B 34/00 |

OTHER PUBLICATIONS

Ashigwuike, Evans Chinemezu; "Coupled Finite Element Modelling and Transduction Analysis of a Novel EMAT Configuration Operating on Pipe Stee Materials"; Thesis; Brunel University London; 232 pages; Sep. 2014.
(Continued)

*Primary Examiner* — Jacques M Saint Surin
(74) *Attorney, Agent, or Firm* — Cantor Colburn LLP

(57) ABSTRACT

A method is provided of inspecting a nested multi-layer structure including a first and second electrically conductive layer and a third layer disposed behind the second conductive layer. The method includes deploying a sensor device including an electromagnetic acoustic transducer to a borehole location proximate to the structure, generating a drive signal including a plurality of frequencies, applying an electrical current signal to the sensor device based on the drive signal and inducing currents in the first conductive layer that induce currents generating acoustic signals having the plurality of frequencies, detecting a first set of resonant frequencies based on received electromagnetic signals, detecting a second set of resonant frequencies based on received acoustic signals, estimating a property of the first (Continued)

and/or the second conductive layer based on the first set of resonant frequencies, and estimating a property of the third layer based on the second set of resonant frequencies.

20 Claims, 19 Drawing Sheets

(51) Int. Cl.
    *G01V 1/46*         (2006.01)
    *G01V 1/50*         (2006.01)
    *E21B 49/00*       (2006.01)
    *G01N 29/12*       (2006.01)

(52) U.S. Cl.
CPC ........... *G01N 29/2437* (2013.01); *G01V 1/46* (2013.01); *G01V 1/50* (2013.01); *G01N 2291/014* (2013.01); *G01N 2291/015* (2013.01); *G01N 2291/0289* (2013.01); *G01N 2291/105* (2013.01); *G01V 2210/1299* (2013.01); *G01V 2210/1429* (2013.01); *G01V 2210/62* (2013.01)

(58) Field of Classification Search
CPC ......... G01N 29/2412; G01N 2291/014; G01N 2291/0289; G01N 2291/2636; G01N 2291/0234; G01V 29/12; G01V 11/00; G01V 1/46; G01V 3/30; G01V 1/50; G01V 1/162; G01V 2210/62; G01V 1/02; G01V 2210/21; G01V 2210/1214; G01V 2210/1299; G01V 2001/526; G01V 2210/60; G01V 2291/015; G01V 2210/43; G01V 2210/1429; G01V 2291/105; E21B 49/00
USPC .......................................................... 73/582
See application file for complete search history.

(56) References Cited

U.S. PATENT DOCUMENTS

| | | |
|---|---|---|
| 7,639,562 B2 | 12/2009 | Patterson et al. |
| 7,660,197 B2 | 2/2010 | Barolak |
| 7,663,969 B2 | 2/2010 | Tang et al. |
| 7,681,450 B2 | 3/2010 | Bolshakov et al. |
| 7,697,375 B2 | 4/2010 | Reiderman et al. |
| 7,698,937 B2 | 4/2010 | Neidhardt |
| 7,773,454 B2 | 8/2010 | Barolak et al. |
| 7,787,327 B2 | 8/2010 | Tang et al. |
| 7,911,877 B2 | 3/2011 | Patterson et al. |
| 8,037,765 B2 | 10/2011 | Reiderman |
| 8,061,206 B2 | 11/2011 | Bolshakov et al. |
| 8,061,207 B2 | 11/2011 | Panetta et al. |
| RE43,960 E | 2/2013 | Barolak |
| 8,553,494 B2 | 10/2013 | Barolak |
| 9,157,312 B2 | 10/2015 | Zhao |
| 9,273,545 B2 | 3/2016 | Bolshakov et al. |
| 9,359,888 B2* | 6/2016 | Lemenager .............. E21B 47/13 |
| 9,556,727 B2 | 1/2017 | Saulnier et al. |
| 9,670,770 B2 | 6/2017 | Mekic et al. |
| 9,690,000 B2 | 6/2017 | Barolak |
| 10,261,005 B2 | 4/2019 | Xia et al. |
| 10,261,053 B2 | 4/2019 | Ten Grotenhuis et al. |
| 10,302,792 B2 | 5/2019 | Patterson et al. |
| 10,401,325 B2 | 9/2019 | Thompson et al. |
| 10,436,018 B2* | 10/2019 | Kouchmeshky ....... G01N 29/28 |
| 10,670,562 B2* | 6/2020 | Donderici ............ G01N 27/902 |
| 2010/0263449 A1* | 10/2010 | Bolshakov ............. G01N 29/07 73/597 |
| 2014/0318767 A1* | 10/2014 | Lemenager .............. E21B 47/12 166/250.01 |
| 2015/0260686 A1* | 9/2015 | Borigo ................... H04R 15/00 324/238 |
| 2015/0338541 A1 | 11/2015 | Nichols et al. |
| 2016/0178579 A1* | 6/2016 | Donderici ............. E21B 47/002 324/238 |
| 2017/0218752 A1* | 8/2017 | Donderici ............. E21B 47/113 |
| 2017/0219530 A1* | 8/2017 | Borigo ................... G01N 29/28 |
| 2018/0100387 A1* | 4/2018 | Kouchmeshky ......... G01V 1/52 |
| 2019/0234204 A1 | 8/2019 | Moronkeji et al. |

OTHER PUBLICATIONS

ASTM Designation: E 1774-96; "Standard Guide for Electromagnetic Acoustic Transducers (EMATs)"; Current editiion approved Dec. 10, 1996; Published Feb. 1997; Available from American Society for Nondestructive Testing, 1711 Arlingate Plaza, Columbus, OH 43228.

Choi et al.; "Electromagnetic Acoustic Transducers for Robotic Nondestructive Inspection in Harsh Environments" Sensors; 18; 193; 13 pages; (2018).

Chopra & Huffman; "Velocity Determination for Pore Pressure Prediction"; CSEG Recorder Journal Recorder; 31(04); 31 pages; (2006).

Crain, E.R.; "Calculating Overburden Pressure"; from Crains's Petrophysical Handbook; 8 pages; printed Sep. 13, 2019.

Ginzel & Turnbull; "Determining Approximate Acoustic Properties of Materials"; Materials Research Institute; Waterloo, Ontario, Canada; 10 pages;(2016); http://www.ndt.net/?id=20452.

Gokaraju et al.; "Shale Fracturing Characterization and Optimization by Using Anisotrophic Acoustic Interpretation, 3D Fracture Modeling and Neural Network"; Presented at the SPWLA 56th Annual Logging Symposium; Long Beach, CA, USA, Jul. 18-22, 2015; 12 pages.

Gu et al.; "Method for Acoustic Anisotrophy Interpretation in Shales When the Stoneley-Wave Velocity is Missing" Petrophysics; vol. 57(2); pp. 140-145, (2016).

Haecker et al.; "A Novel Technique for Measuring (Not Calculating) Young's Modulus, Poisson's Ratio and Fractures Downhole: A Bakken Case Study"; Presented at SPWLA 58th Annual Logging Symposium, Jun. 17-21, 2017; 18 pages.

Market & Tudge; "A Layman's Guide to Acoustic Anisotrophy"; Presented at the SPWLA 58th Annual Logging Symposium, held in Oklahoma City, Oklahoma, USA, on Jun. 17-21, 2017; 25 pages.

Market et al.; "Acoustic Fracture Characterisation—Intelligent Interpretation"; Presented at the SPWLA 58th Annual Logging Symposium; held in Oklahoma City, Oklahoma, USA, on Jun. 17-21, 2017.

Mavko et al.; Abstract only; "Tools for Seismic Analysis of Porous Media"; from The Rock Physics Handbook; 2nd Edition, Published Apr. 2009; Cambridge Univeristy Press (ISBN 9780521861366, Replaced by 9781108420266).

Murphy et al.; "New Models for Acoustic Anisotrophic Interpretation in Shale"; Presented at the SPWLA 56th Annual Logging Symposium; held in Long Beach, CA, USA, on Jul. 18-22, 2015; 15 pages.

Nauroy, Jean-Francois; "Dynamic Moduli of Elasticity"; from Geomechanics Applied to the Petroleum Industry; TECHNIP Editions; Chapter 1, Section 1.1.2.6; Editions Technip; 4 pages; Published (2011).

Wiki, Petro; "Methods to Determine Pore Pressure"; Petrowiki.org; 11 pages; (2019); https://petrowiki.org/Methods_to_determine_pore_pressure.

Wiki, Petro; "Rock Mechanical Properties"; 5 pages; (2015); printed Sep. 13, 2019; Copyright 2012-2019, Society of Petroleum Engineers; Retrieved from https://petrowiki.org/index.php?title+Rock_mechanical_properties&oldid=48049.

Wikipedia; "Electromagnetic Acoustic Transducer"; 5 pages; Printed Feb. 29, 2020; https://en.wikipedia.org/wiki/Electromagnetic_acoustic_transducer.

* cited by examiner

ESTIMATION OF FORMATION AND/OR DOWNHOLE COMPONENT PROPERTIES USING ELECTROMAGNETIC ACOUSTIC SENSING

BACKGROUND

Subterranean operations are performed in various fields, including fields related to energy production. For example, boreholes or wells are drilled as part of hydrocarbon exploration and production operations, and as part of other energy industry operations such as geothermal production. Various components and devices are often deployed into a borehole to facilitate such operations.

For example, oil and gas wells are typically constructed of casings and tubings ideally in concentric multilayered cylindrical configurations with annular spaces in-between that are filled with fluids including completion, drilling and or production fluids such as gas, oil, or brine as well as bonding agents that are typically oilfield cements. The integrity of these wells against production fluid leakages via the annular spaces need to be ensured at commencement of production and at end of life abandonment of well.

BRIEF SUMMARY

An embodiment of a method of inspecting a nested multi-layer structure disposed in a borehole includes deploying a sensor device including an electromagnetic acoustic transducer to a location in the borehole proximate to the multi-layer structure, the multi-layer structure including at least a first electrically conductive layer, a second electrically conductive layer, and a third layer disposed behind the second conductive layer. The method also includes generating a drive signal including a plurality of frequencies selected based on physical properties of the multi-layer structure, applying an electrical current signal to the sensor device based on the drive signal, the electrical current signal inducing currents in the first conductive layer, the induced currents generating acoustic signals having the plurality of frequencies in the multi-tubular structure, detecting a first set of resonant frequencies based on electromagnetic signals received at the transducer, detecting a second set of resonant frequencies based on acoustic signals received from the multi-layer structure, estimating a property of at least one of the first conductive layer and the second conductive layer based on the first set of resonant frequencies, and estimating a property of the third layer based on the second set of resonant frequencies.

An embodiment of a method of inspecting a downhole component including an electrically conductive tubular structure includes generating a drive signal including a plurality of frequencies selected based on physical properties of the tubular structure, applying an electrical current signal to the sensor device based on the drive signal, the electrical current signal inducing currents in the tubular structure, the induced currents generating acoustic signals having the plurality of frequencies in the tubular structure, detecting a set of resonant frequencies based on detection of received signals, the received signals associated with reflections of the acoustic signals, and analyzing the set of resonant frequencies, and determining whether a defect is present in the tubular structure.

An embodiment of a method of evaluating a subterranean region surrounding a borehole includes deploying a sensor device including an electromagnetic acoustic transducer to a location proximate to a surface of an open hole section of the borehole, generating a drive signal including a plurality of frequencies selected based on physical properties of a subterranean region adjacent to the borehole, applying an electrical current signal to the electromagnetic acoustic transducer to generate an acoustic signal at a first location in the region, the acoustic signal propagating in a direction along the surface of the open hole section to a second location, detecting the acoustic signal at the second location, and estimating a property of the region based on the detected acoustic signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Figure 1:
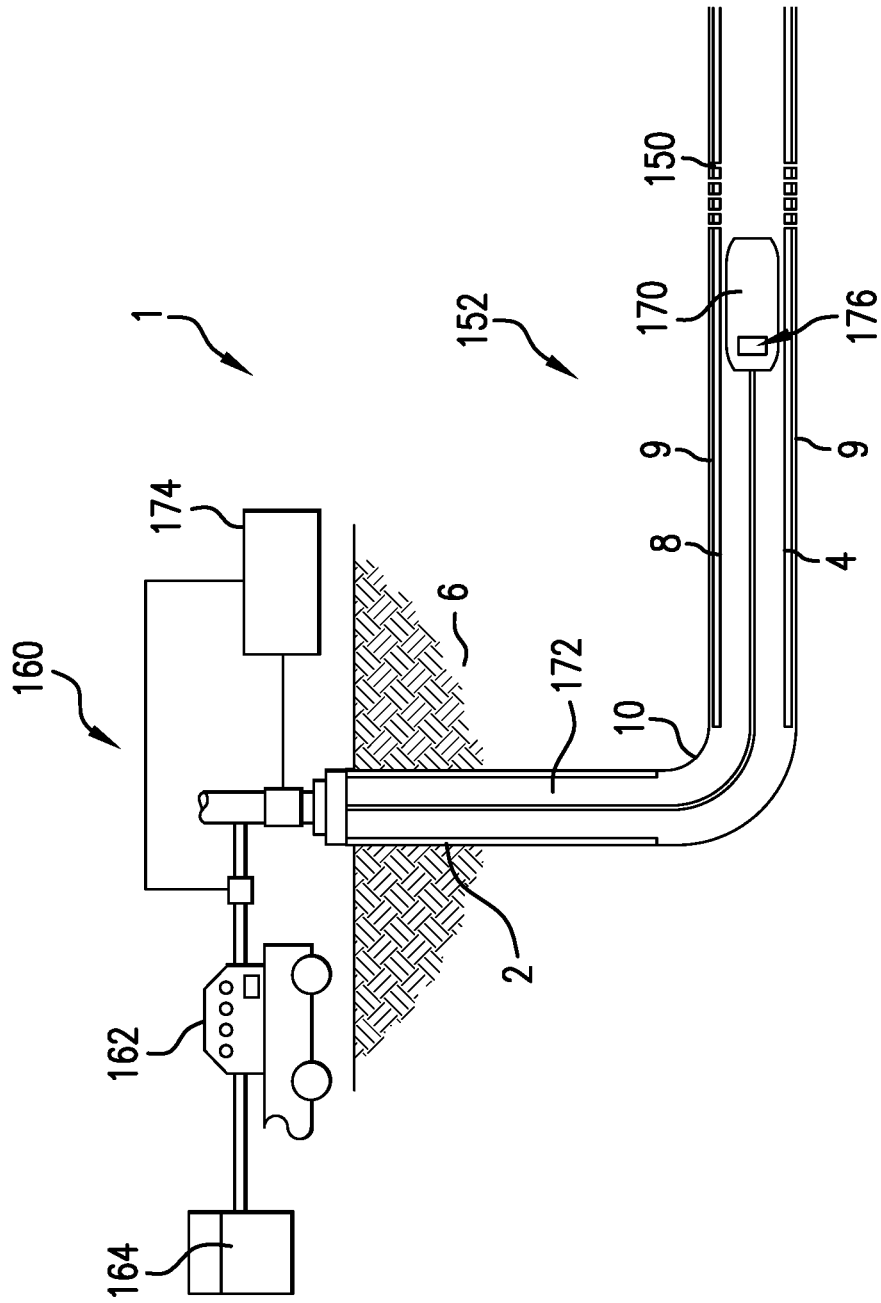
FIG. 1 depicts an embodiment of a system for performing subterranean operations.

FIG. 1 illustrates an embodiment of a system 1 for performing subterranean operations and/or energy industry operations, such as a stimulation, completion, measurement and/or hydrocarbon production system 1. The system 1 includes a borehole string 2 that includes a production string 4 that is configured to be deployed in a resource bearing formation or other subterranean region 6. For example, the borehole string is disposed in a well or borehole 10 that penetrates the region 6. The system 1 is not limited to the embodiments described herein, as the system 1 may be configured for various purposes, such as well drilling operations, completions, resource extraction and recovery, steam assisted gravity drainage (SAGD), $CO_2$ sequestration, geothermal energy production and other operations for which fluid flow control is desired.

In this embodiment, the production string 4 is deployed as part of or through a cased portion of the borehole 10. The cased portion includes a casing 8 or other tubular (e.g., a liner) that is secured to the borehole 10 by cement 9 injected between the casing 9 and the borehole wall. To produce fluids from the formation 6, a plurality of fluid ports 150 (e.g., perforations or holes) are located along the casing 8. The fluid ports 150 may be positioned in clusters within a section of the casing to define a production zone 152. Although only one production zone 152 is shown, it is to be recognized that multiple production zones may be located along the borehole 14.

The borehole string 2 may include additional components to facilitate production and/or other operations. For example, a production assembly including one or more production fluid flow control components, such as a screen assembly and/or an inflow control device (ICD), can be deployed for production of fluid from the production zone 152. Other components include one or more packer assemblies, each of which includes one or more packer elements, which are actuated to isolate components and/or zones in the borehole 10. The packer assemblies can be used to establish production zones around the borehole 10, such as the production zone(s) 152.

The system 1 may also include various surface and/or downhole sensors. Examples of such sensors include downhole temperature and pressure sensors, strain sensors, fluid property sensors (e.g., fluid pressure and/or flow rate sensors), and others. Sensors can be used for various purposes, such as monitoring downhole conditions, monitoring component integrity and operation, measuring borehole and formation fluids, and estimating formation properties (e.g., using resistivity sensors, pulsed neutron sensors and others).

The system 1 also includes surface equipment 160 such as a drill rig, rotary table, top drive, blowout preventer and/or others to facilitate deploying the borehole string 2 and/or controlling downhole components. For example, the surface equipment 160 includes a fluid control system 162 including one or more pumps in fluid communication with a fluid tank 164 or other fluid source.

The system 1 includes or receives an inspection tool or assembly 170 that is configured to measure properties of various downhole components. The inspection tool 170 may be used to measure properties of various downhole components to determine whether any damage has occurred, whether the component is functioning properly, estimating remaining useful life, or otherwise evaluate the integrity of the component. For example, the inspection tool 170 is configured to be deployed proximate to (i.e., close enough to perform a measurement) the casing 8 and evaluate the integrity of the casing 8 and/or the cement 9.

In one embodiment, the inspection tool 170 is configured to be deployed into the borehole via a running string 172, such as a wireline or cable, or coiled tubing. In other embodiments, the inspection tool 170 (or sensor device) is installed directly onto the casing 8 and/or is installed in another assembly or component, such as a production string or logging tool.

In one embodiment, the system 1 includes a processing device such as a surface processing unit 174, and/or a subsurface processing unit 176 disposed in the borehole 14 and connected to one or more downhole components. The processing device may be configured to perform functions such as controlling downhole components, controlling fluid circulation and/or fluid injection (e.g., controlling and/or communicating with the fluid control system), monitoring or inspecting components during deployment, inspecting multi-layer components, inspecting a formation or other subterranean region, transmitting and receiving data, processing measurement data and/or monitoring operations. It is noted that any of the methods described herein may be performed, all or in part, by a processing device such as the surface processing unit 174 or the subsurface processing unit 176, alone or in conjunction with a human operator.

Embodiments described herein are applicable to measurement and/or inspection of a variety of materials and/or components. For example, the embodiments may be applied to a multi-layer structure. An example of a multi-layer structure is a multi-tubular nested structure, which includes a number of annular layers that are nested within each other. The annular layers may include or more conductive layers formed by casings, liners or other tubulars, and may also include other material layers such as cement layers.

Figure 2:
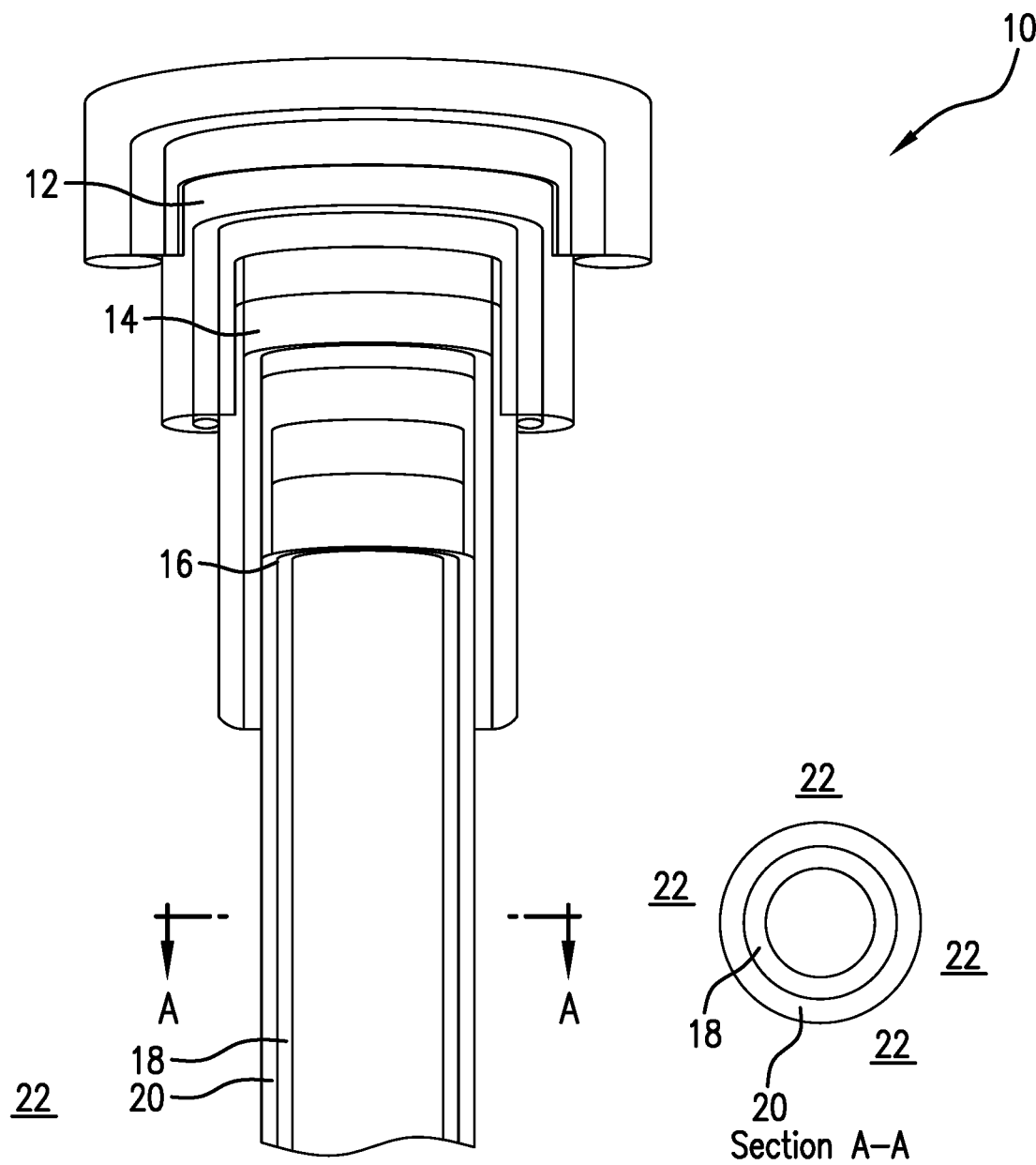
FIG. 2 depicts an example of a section of a borehole having multiple nested tubulars defining multiple layers.

FIG. 2 depicts an example of section of a borehole, such as the borehole 10, that has multiple nested tubulars. FIG. 2 shows a series of cylindrical casings 12, 14, 16 and 18. As is seen in FIG. 2, as the depth increases, the number of layers around the casings reduce, and at depths of about 1000-3000 meters, the number of layers around the casing is one or two. For example, the casing 18 has only a cement wall 20 surrounding an outer surface of the casing, and bedrock 22 beyond the cement wall. In one example, the borehole 10 may have dimensions of about 80-360 mm, and may be filled with oil, gas, water or brine and have a temperature up to 180 degrees and a pressure of 15000-20000 psi. The steel casing 18 may be 8-36 mm thick and have a carbon content of 0.1-0.5%, and the cement wall may have a thickness of 25-55 mm.

In one embodiment, the inspection tool 160 is an acoustic tool that is configured to measure properties of components, fluids and/or subterranean materials (e.g., rock) utilizing a combination of electromagnetic and acoustic signals. For example, the inspection tool 160 includes an electromagnetic acoustic transducer (EMAT), which measures component properties by applying an alternating current to an electrically conductive component such as the casing.

FIG. 3 an example of a sensor device having an EMAT transducer 180. The EMAT transducer 180 includes a conductor such as a conductive coil 182 that applies an alternating current to a tubular or other conductive component. The EMAT transducer 180 also includes a magnetic device 184 such as one or more magnets. In this example, the magnetic device 184 includes an array of permanent magnet pairs, however other magnetic devices may be used (e.g., a single permanent magnet or an electromagnet). The applied current induces eddy currents in the component, which interacts with the magnetic field applied by the magnetic device 184 and generates alternating Lorentz forces. The Lorentz forces create acoustic waves that propagate through the component and produce reflections from, e.g., interfaces between layers of materials, micro-annuli, features of cement and/or casing, and/or discontinuities due to cracks, damage or other conditions. The reflections may be detected by the coil 182, a different coil, another EMAT transducer and/or an acoustic receiver or transducer (e.g., a piezoelectric transducer).

Figure 3A:
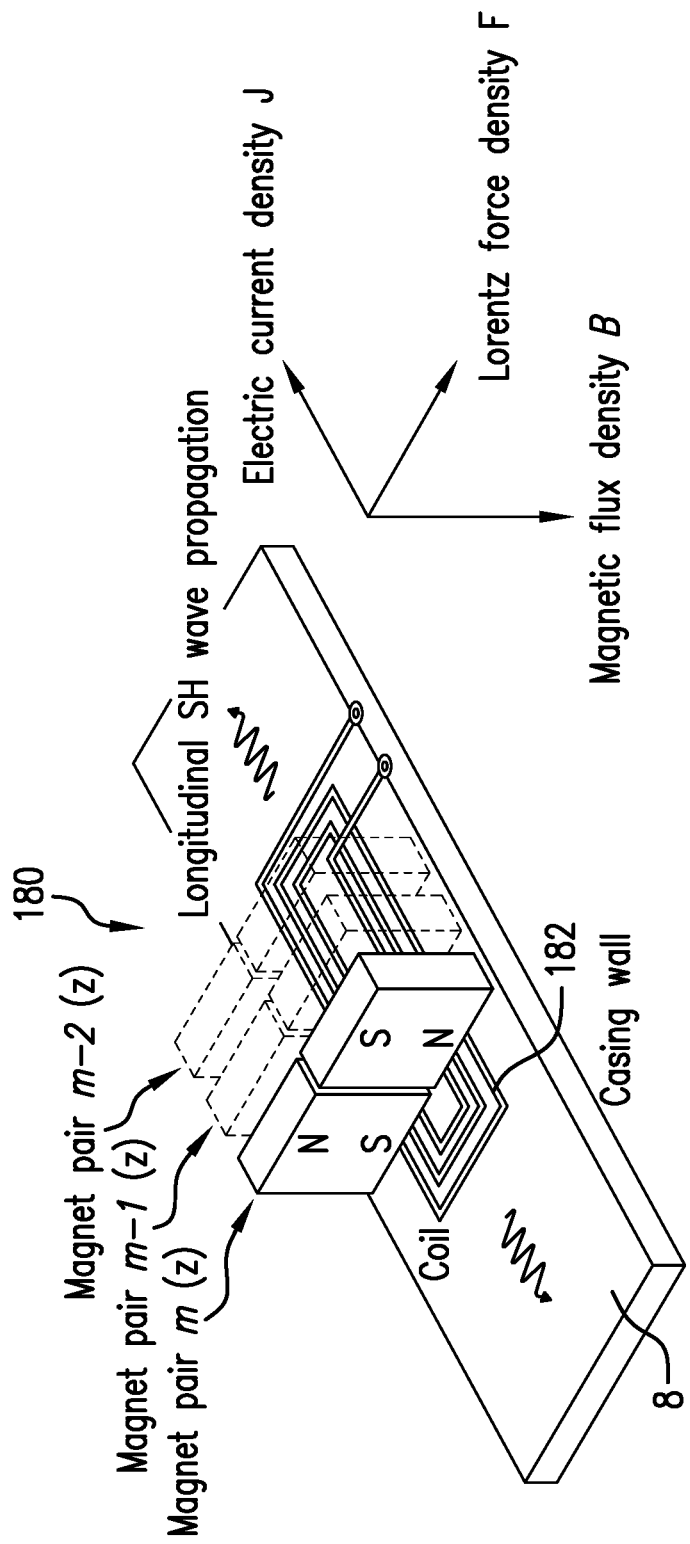
FIG. 3 depicts an embodiment of a sensor device including an electromagnetic acoustic transducer (EMAT)
Figure 3B:
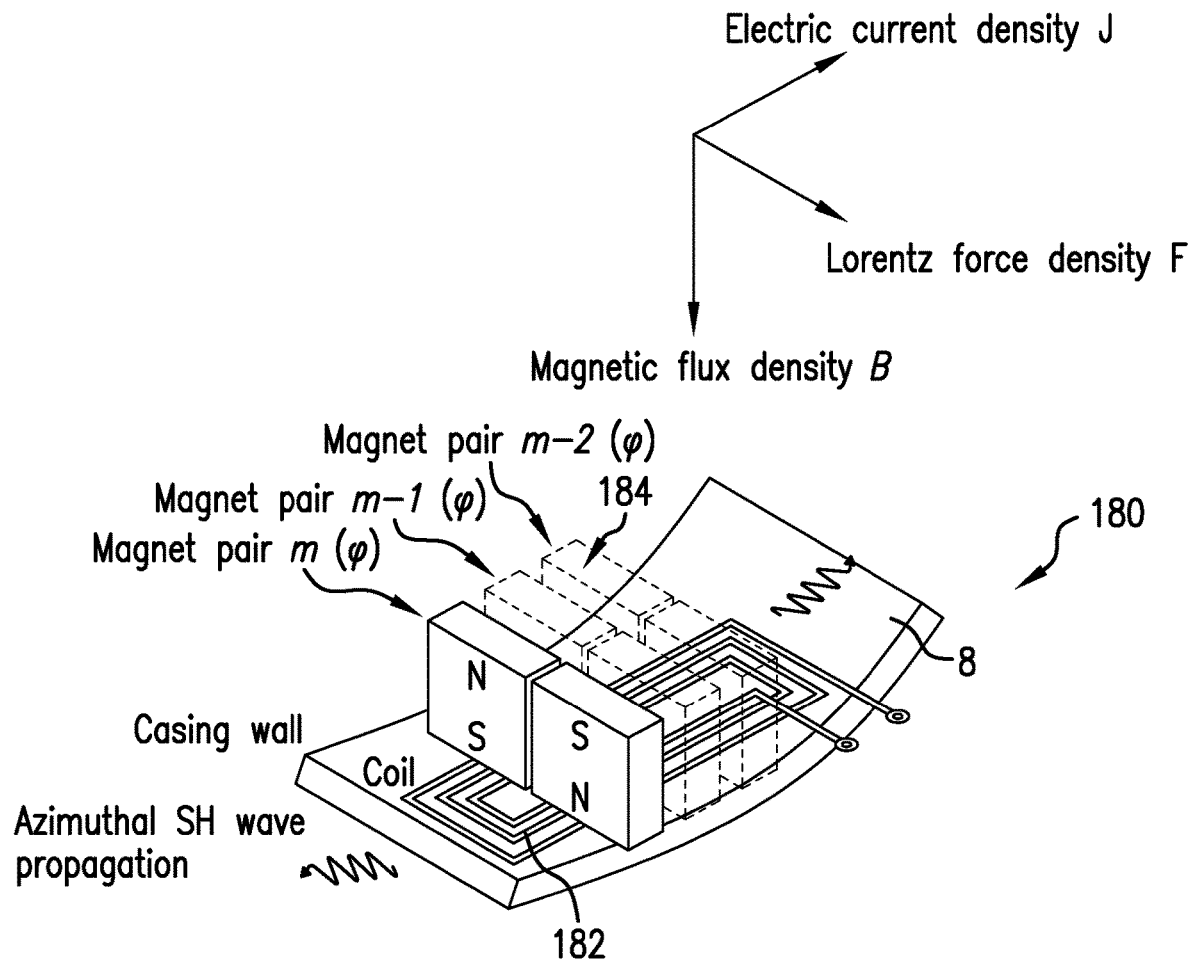

FIG. 3 also shows examples of configurations of the EMAT transducer 180 relative to the casing 8 or other component. In one example, shown in FIG. 3A, the EMAT transducer 180 is oriented longitudinally, i.e., in a direction at least partially parallel to a longitudinal axis of the tubular. In another example, shown in FIG. 3B, the EMAT transducer 180 is oriented transversely, i.e., in a direction at least partially perpendicular to the longitudinal axis. The orientation of FIG. 3B can also be referred to as a circumferential or azimuthal orientation.

As discussed further below, EMAT sensors have advantages over conventional acoustic sensors used in downhole inspections. For example, EMAT sensors do not require fluid coupling.

Generally, the sensor devices described herein may be used to measure or inspect various components and/or materials. As discussed further below, methods described herein may be used for purposes such as inspecting downhole components (e.g., nested tubulars) and materials in a subterranean region (e.g., formation materials and fluids). One such purpose is inspection of downhole components to detect discontinuities such as damage to tubulars, micro-annuli in tubulars and cement, stuck pipe conditions, split pipe conditions and others. Another purpose is inspection of a subterranean region for, e.g., formation evaluation. In the context of multi-layer or multi-tubular components, layers may be referred to as well integrity layers and/or barrier layers.

Detection of cement de-bonding or occurrence of micro-annuli in one or more of well integrity layers, which include casing, cement, and the interface layers of casing-cement, and casing-bedrock is important for determining well integrity in oil and gas wells, as mentioned herein above. Embodiments are described herein for determining component integrity or well integrity uses uniquely, the resonances reflected from the well integrity layers to determine well integrity features and in some embodiments a geometry characterization image of the different well integrity layers. Well integrity features include but are not limited to a presence or absence of micro-annuli, length and thickness of micro-annulus and cement de-bonding. A micro-annulus referred herein implies generally an annulus of about 1.5 mm or less. It would be appreciated by those skilled in the art that the dimensions of annulus to be detected can be varied based on user requirement.

The reflected resonances described herein are acoustic resonances, where a frequency of resonance matches one of the natural frequencies that are transmitted through the well integrity layers. The well integrity layers may include oil or gas or water or air, or different combination of these, besides a material of the well integrity layer, such as steel or cement or rock, and these are referred generally as a "medium" for transmission and reflection purpose.

Aspects of embodiments use the principle that when a sound wave of a particular frequency is incident on a cavity, it bounces back and forth between the cavity walls. If the frequency of the sound wave is such that an integral number of wavelengths fit in the round trip distance, then the incident and reflected waves constructively interfere, causing resonances. Therefore, the resonance criterion is:

$$2d = nX \qquad \text{Equation 1}$$

Here d is the cavity length, n is an integer and X is the wavelength of the sound wave. If the speed of the sound wave in the medium is c, then the frequency of the sound wave $f=c/\lambda$. Therefore, $$f_n = nc/2d \qquad \text{Equation 2}$$

$$\Delta f = f_{(n+i)} - f_n = c/2d \qquad \text{Equation 3}$$

This means that the spacing between two consecutive resonances depends only on the speed of sound in that medium and the length of the medium. If the length of the medium is known, the speed of sound in the medium can be determined by finding the frequency spacing between the resonances. From this, the medium may be identified.

Figure 4:
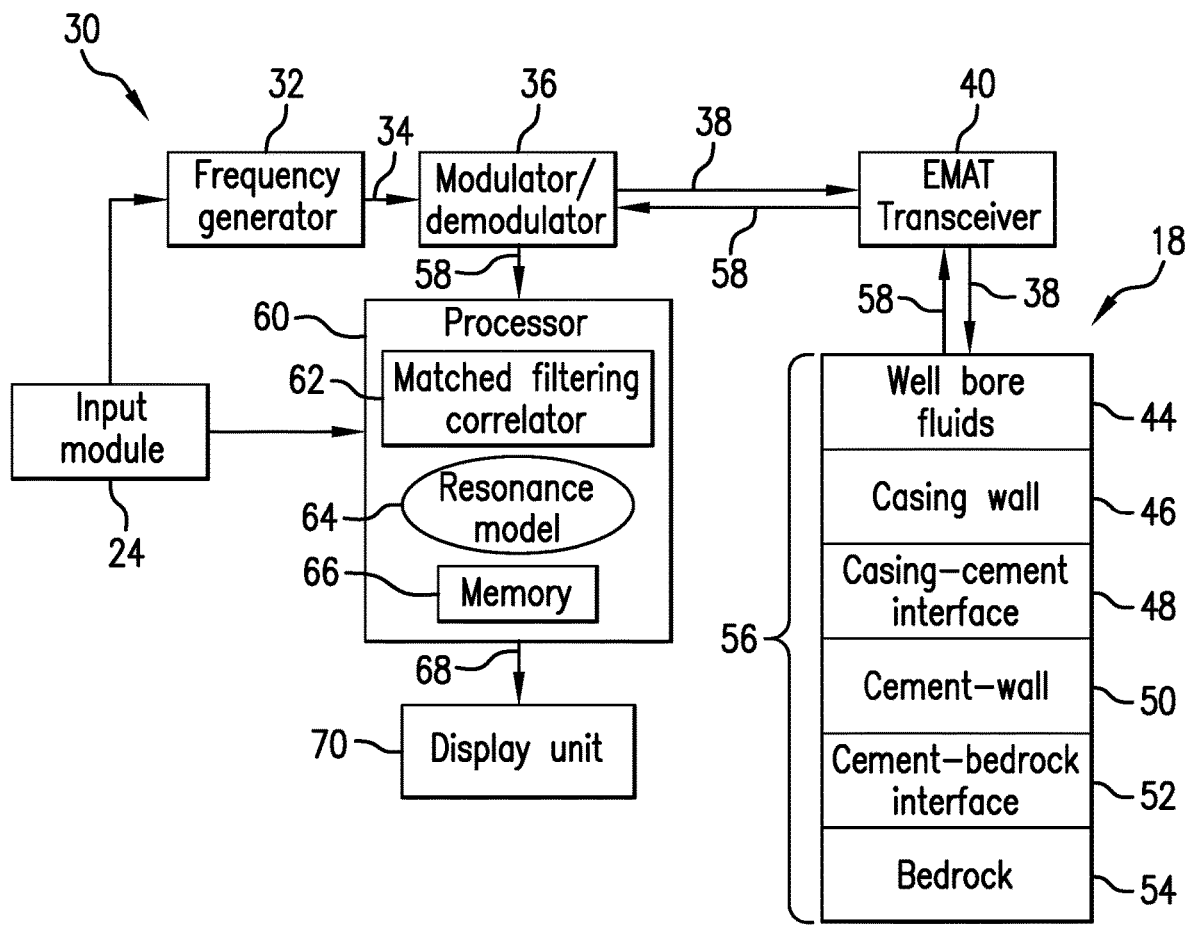
FIG. 4 is a block diagram representation of an embodiment of an apparatus for inspecting a downhole structure and/or a subterranean region.

FIG. 4 is a diagrammatic representation of an embodiment of an apparatus 30 for determining well integrity (i.e., integrity of downhole components and/or a borehole) and/or estimating properties of downhole components and subterranean materials. It would be appreciated by those skilled in the art, that the apparatus 30 is deployed at a given depth, such as within the casing 8 in FIG. 1 or inside the casing 18 in FIG. 2, and therefore has material and structural integrity to withstand the high pressures and high temperatures at these depths.

In one exemplary embodiment, the apparatus 30 is a downhole apparatus, where 'downhole' implies that the apparatus is deployed at a predetermined depth inside the well bore. In some other embodiments, part of apparatus 30 may be provided as a downhole tool, and a part may be provided as a surface module that is in communication with the downhole tool.

The apparatus 30 includes an input module 24 that is used to provide user defined or sensor based inputs or preprogrammed inputs to select components/modules of the apparatus 30. The input module 24 includes codes and routines configured to receive the inputs and is implemented using a processor and a memory, as tangible non-transitory components.

The apparatus 30 includes an acoustic frequency generator 32 for generating multiple acoustic frequencies 34 using typically a bulk wave in a range of about 1-10 Mega Hertz (the input module 24 provides the instruction to the frequency generator 32 for the desired bulk wave generation). The acoustic frequency generator 32 in one embodiment is implemented using an oscillator and amplifier through known circuitry.

The apparatus 30 further includes a modulator/de-modulator 36 for selecting a set of acoustic frequencies 38 from multiple acoustic frequencies 34, and applying a transmission sequence to the set of acoustic frequencies. A transceiver 40 is used for generating acoustic signals having the set of acoustic frequencies 38 in the selected transmission sequence into a component such as a nested multi-layer or multi-tubular component. For example, the acoustic signals can be generated in the well integrity layers of steel casing wall 46, interface of steel casing wall and cement wall 48, cement wall 50, interface of cement wall and bedrock 52, and bedrock 54.

It would be appreciated by those skilled in the art that different transmission sequences may be used, for example but not limited to, a sequence where the set of acoustic frequencies are transmitted one at a time by using for example a frequency modulated signal like a chirp signal. In another implementation, the set of acoustic frequencies are transmitted as a coded signal, which is a digital signal, in yet another example, a set of pre-selected frequencies are transmitted simultaneously.

The transceiver 40 also receives reflected resonances 58 corresponding to at least a subset of natural frequencies of the set of acoustic frequencies, which are associated with different layers. For example, the set of frequencies may include frequencies that are reflected from different well integrity layers in a field of view of the set of transmission frequencies, shown generally by reference numeral 56. It would be appreciated by those skilled in the art that the field of view may be different for different implementations, and may be dependent to some extent on a choice of a user (user may be an owner or a customer or a technical expert associated with the hydrocarbon-producing well), as well as on choice of transmission frequencies and transmission sequence.

It would be understood by those skilled in the art that once the set of acoustic frequencies penetrate a borehole and the layers, the resonances that are effected are based on the physical properties of the layers that are encountered by these set of acoustic frequencies. Thus, each selected frequency is a frequency that corresponds to a resonance frequency that is reflected from a particular layer, material, interface and/or feature.

For example, if a first frequency travels through a metal surface (i.e. casing wall), it will reflect a particular resonance, say a first resonance that will be a function of the first frequency. Similarly, if a second frequency travels through a micro-annulus (could be present in the casing-cement interface, or in the cement wall, or in the cement-bedrock interface), it will reflect a different resonance, say a second resonance that will be a function of second frequency. Still further, if the micro-annulus is filled with a fluid (also sometimes referred to as 'medium', for example, oil or water), a third frequency will be reflected back as a third resonance, which will be a function of the third frequency, from the micro-annulus. Still further, if a fourth frequency travels through cement, a fourth resonance is reflected back, which is a function of the fourth frequency. Furthermore, the same resonance, for example, the first resonance, will be reflected multiple times depending on the continuity of the particular layer, in the case of first frequency has the metal layer, in its field of view. It may also be noted that there will be some frequencies that do not have any reflected resonances.

It would be appreciated by those skilled in the art, that knowing what are the possible materials of the well integrity layers, the set of frequencies for transmission can be pre-determined. For example, the layers may include, steel in case of well casing, air in case of unfilled micro-annuli, fluid (oil or water) in case of filled or partially filled micro-annuli, cement, and bed-rock form other layers. Thus, using this prior knowledge, frequencies that are known to have reflected resonances of particular characteristics for specific layers and/or features, can be pre-selected for transmission. This allows for very quick assessment of reflected resonances.

The transceiver 40 described herein above, in one embodiment, is implemented by using an electromagnetic acoustic transducer (EMAT). Such a transducer may be used to remove a necessity of any couplant required for placing the transceiver 40 close to the casing wall. In case EMAT transducer is used, it may be used in an array format to enable transmission of multiple frequencies as a set of frequencies and for receiving reflected resonances from different layers. In other embodiments, the transceiver is implemented as an acoustic transducer, in place of or in combination with the EMAT transducer(s). An example of an acoustic transducer is piezoelectric transducer including, e.g., a broadband piezoelectric crystal. Further, in one implementation an air coupled piezo electric crystal may be used as the transceiver 40, that will work for any medium or material, and in a different implementation a conventional couplant based piezoelectric crystal maybe used that works for oil and other fluid medium. In some embodiments, a phased array of transducers may be used. Any type of transducer that is capable of transmitting multiple frequencies and receiving reflected resonances from the different layers, may be used. In some embodiments an array of sensors is used as a transceiver to allow a two- or three-dimensional reconstruction of an image of various layers and/or features, described herein below.

Referring back to FIG. 4, a processor 60 may be coupled to the transceiver 40 via the modulator-de-modulator 36 for processing the reflected resonances. The output of the processing yields a geometry characterization image of each of the layers and features based on the reflected resonances (this is processor output, and referred generally by reference numeral 68). In one implementation, the geometry characterization image received as processor output 68 is a three-dimensional image. The geometry characterization image includes thickness of each layer derived using the reflected resonances. The well integrity features include, but are not limited to, a presence or absence of micro-annuli, the location and the extent of penetration of micro-annuli, as well as extent of cement de-bonding. These well integrity features are then used for any maintenance operation or any other control action for the oil and gas well.

The processor 60 referred herein above, may include filters to estimate resonant frequencies for example, a matched filtering correlator (for analog signals) 62 for detecting the reflected resonances. It would be appreciated by those skilled in the art that either analog or digital processing techniques will be employed based on the nature of transmitted signal. Further, the processing may include either time domain analysis or a frequency domain analysis.

In an exemplary implementation, the processor 60 includes a resonance model 64 comprising modelled resonances that is used for comparing the reflected resonances received from the transceiver 40 and for correcting for errors based on the modelled resonances. For selecting resonant peaks, based on the comparison, spectrum analysis known in the art, may be used. In one example a correction factor is determined through the resonance model to correct for errors in the reflected resonances. Correction factor corrects errors present in the reflected resonances due to speed of sound variation with temperature and/or pressure at the depths where the transmission of the set of frequencies and the reflection of resonances occurs. Correction factor in some cases may also be provided to account for any material oxidation, or any operating parameter of the hydrocarbon-producing well, such as flow rate, fluid property such as oil/gas ratio, well pipe property like density, that impact the transmitted frequencies or reflected resonances. The well parameters referred herein above—temperature, pressure, material oxidation, operating parameters, and the like, are provided through the input module 24.

In one exemplary implementation, the modelled resonances are pre-defined resonances for different well integrity layers at different depths beyond 1000 meters. These modelled resonances are generated based on pre-selected frequencies of transmission and their respected known reflected resonances for different well integrity layers. The resonance model 64 in some implementations, also includes different modelled geometry characterization images of each layer based on modelled resonances and modelled physical characteristics of the respective well integrity layers. The resonance model, in some implementations will include a look-up table for storing (in a tangible memory in a computer implemented storage medium) the modelled resonances, modelled geometry characterization images, and modelled physical characteristics, and other such contents of the resonance model 64. The resonance model 64 may further include modelled well integrity characteristics that are derived from the modelled geometry characterization images in the resonance model.

The physical characteristics referred herein above include but are not limited to, a smoothness factor of each layer, material properties of each layer, and the like. The modelled well integrity characteristics referred herein above include but are not limited to, a presence of micro-annulus, different dimensions of the micro-annulus, presence of cement de-bonding, extent of de-bonding and other related well-integrity characteristics.

The resonance model 64 described herein includes codes and routines configured for implementing the functionality of the resonance model and is implemented using a processor and a memory, as tangible non-transitory components.

The output 68 of the processor 60 may be communicated to an external or integrated display unit 70 for further control and maintenance actions. The display unit 70 may be implemented as a graphical user interface accessible for a user/operator or another communication device.

It would be understood by those skilled in the art that the different components of the apparatus 30 are in appropriate communication with each other, and the communication network, along with electrical and power network is provided for implementing the above functionalities of the different components of the apparatus 30 shown in FIG. 4. Standard industry protocols may be used for implementing the connections between the different components of the apparatus 30.

It is noted that, although the apparatus 30 is described in conjunction with a multi-layer structure, the apparatus is not so limited. For example, the apparatus 30 may be used with a method of inspecting or estimating properties of a hydrocarbon bearing formation or other subterranean region around a borehole. In such an example, the transceiver 40 is positioned proximate to a borehole wall in an open hole section of a borehole, or otherwise positioned so that electrical currents and/or acoustic signals are generated in formation or region material at or near the borehole.

Figure 5:
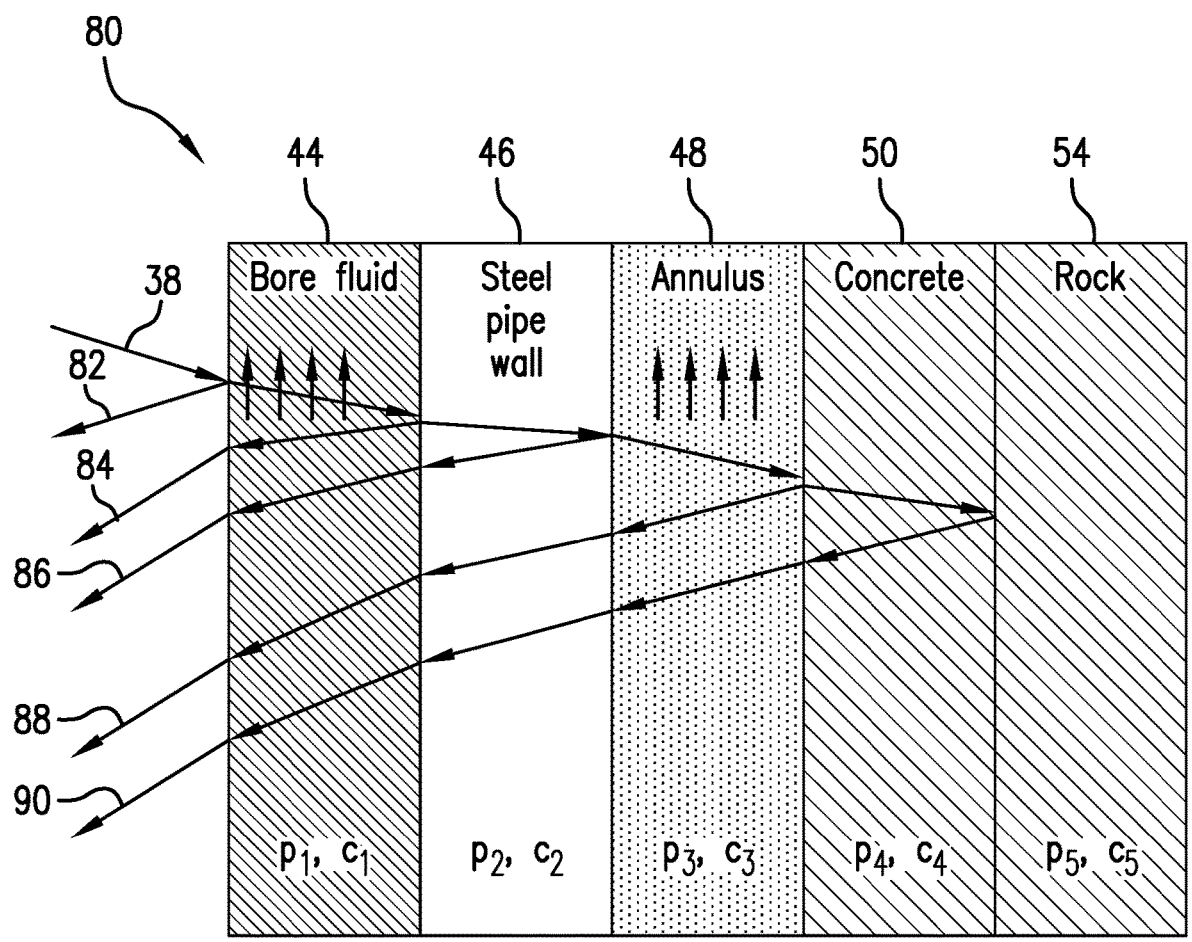
FIG. 5 is a diagrammatic representation of an exemplary wave propagation representation of a set of frequencies transmitted into a borehole and reflected resonances from different well integrity layers.

FIG. 5 is a diagrammatic representation 80 to show the transmission of a set of frequencies 38 into different well integrity layers as referred herein above. As is shown in FIG. 3, arrows represented by reference numerals, 82-90 are representative resonance frequencies reflected from different material or medium of the well integrity layers such as well bore fluids such as oil or water 44, steel casing wall 46, air or water in annulus created in an interface 48 of steel casing wall and concrete (or cement) wall, concrete (or cement) wall 50, and bedrock 54. The densities of different layers and corresponding velocities of sound in that medium are shown as $p_i$ n, and $C_i$ n in FIG. 3.

The processor 60 as described herein above in reference to FIG. 4, can be used to determine a match between the representative frequencies in the set of frequencies 38 and their resonances 82-90 as shown in FIG. 5. Further analysis is done using known signal processing techniques such as match filtering, de-chirping, Hilbert Transform method, or other methods that are known in the art, to detect specific resonances. Once the filtered resonances are available, the distance between subsequent peaks for a given resonance is used to determine the thickness of each layer and to obtain other well integrity features as referred herein above.

Figure 6:
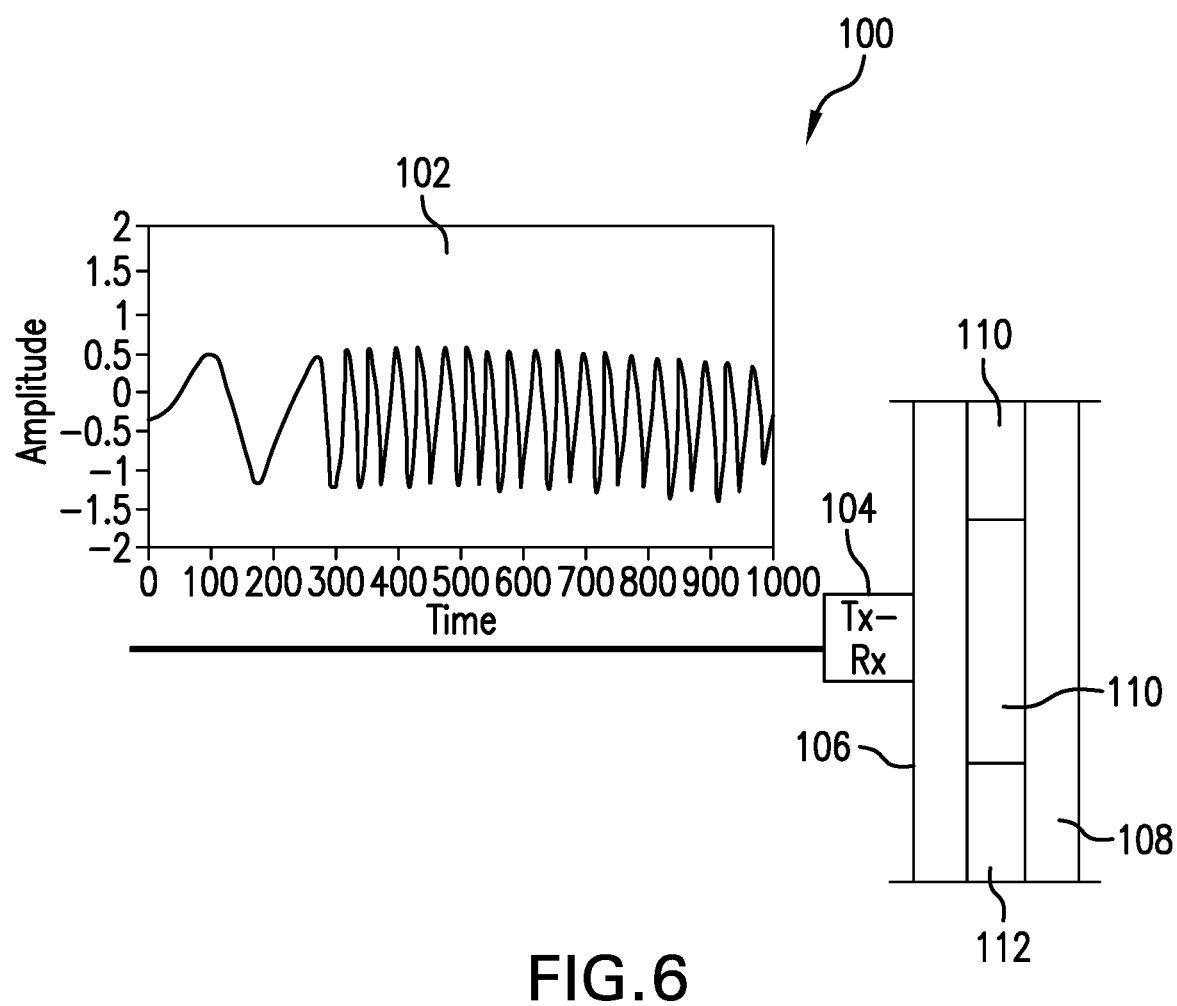
FIG. 6 is a diagrammatic representation of an experimental set-up to represent an implementation of an embodiment of the apparatus in representative well integrity layers.

FIG. 6 is a diagrammatic representation 100 of an experimental set-up for transmitting a set of frequencies represented by waveform 102 through a transceiver 104 into a steel layer 106, and 108, that has a pre-fabricated annulus 110 filled with water, created using a spacer material 112 disposed at two ends of the steel layer 106, as shown in FIG. 6. This experimental set-up emulates the steel casing with a water filled annulus in a hydrocarbon-producing well, and the well integrity layers are represented by the steel layers 106, and the water filled annulus 110 in this experimental set-up. The experimental setup shows that the transceiver 104 is in contact with the steel layer 106. However, it would be understood by those skilled in the art that the transceiver 104 may not be required to be in physical contact with the steel layer in some implementations in an actual hydrocarbon-producing, and as such both embodiments where the transceiver is in contact with the well casing and embodiments where the transceiver is not in contact with well casing is covered within the scope of the invention described herein.

Figure 7:
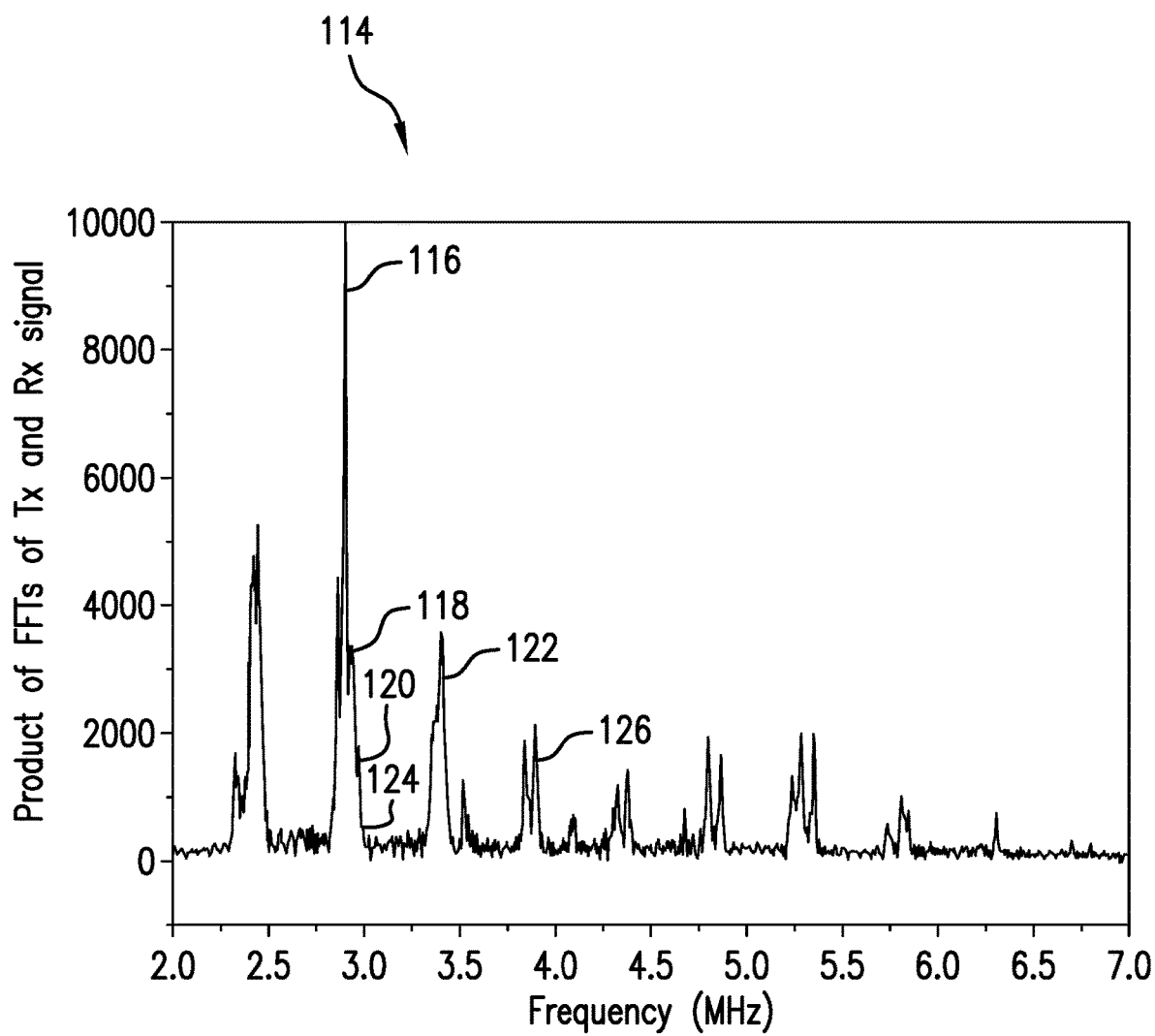
FIG. 7 is an illustrative representation of waveform of reflected resonances obtained in the experimental set-up of FIG. 6.

FIG. 7 is a waveform representation 114 of reflected resonances received back from the steel layers 106 and 108 (in the experiment stainless steel blocks of thickness 5.87 mm were used), and water filled annulus 110 (in the experiment the annulus was created using a spacer of 1.14 mm thickness). As is seen in FIG. 7, the peaks of the waveform are representative of the layer (or medium or material) that is responsible for the reflected resonances. Few of the peaks have been marked for illustrative purpose as 116-126, however all the peaks are processed to determine parameters referred earlier as well integrity features, such as thickness of each layer, presence and extent of annulus, and detection of medium or material present in the annulus. The distance between two subsequent peaks of the resonances from the same layer, can be used to determine a thickness of that layer. Also, the peaks occurring at different heights are indicative of reflected resonances from different layers.

Figure 8:
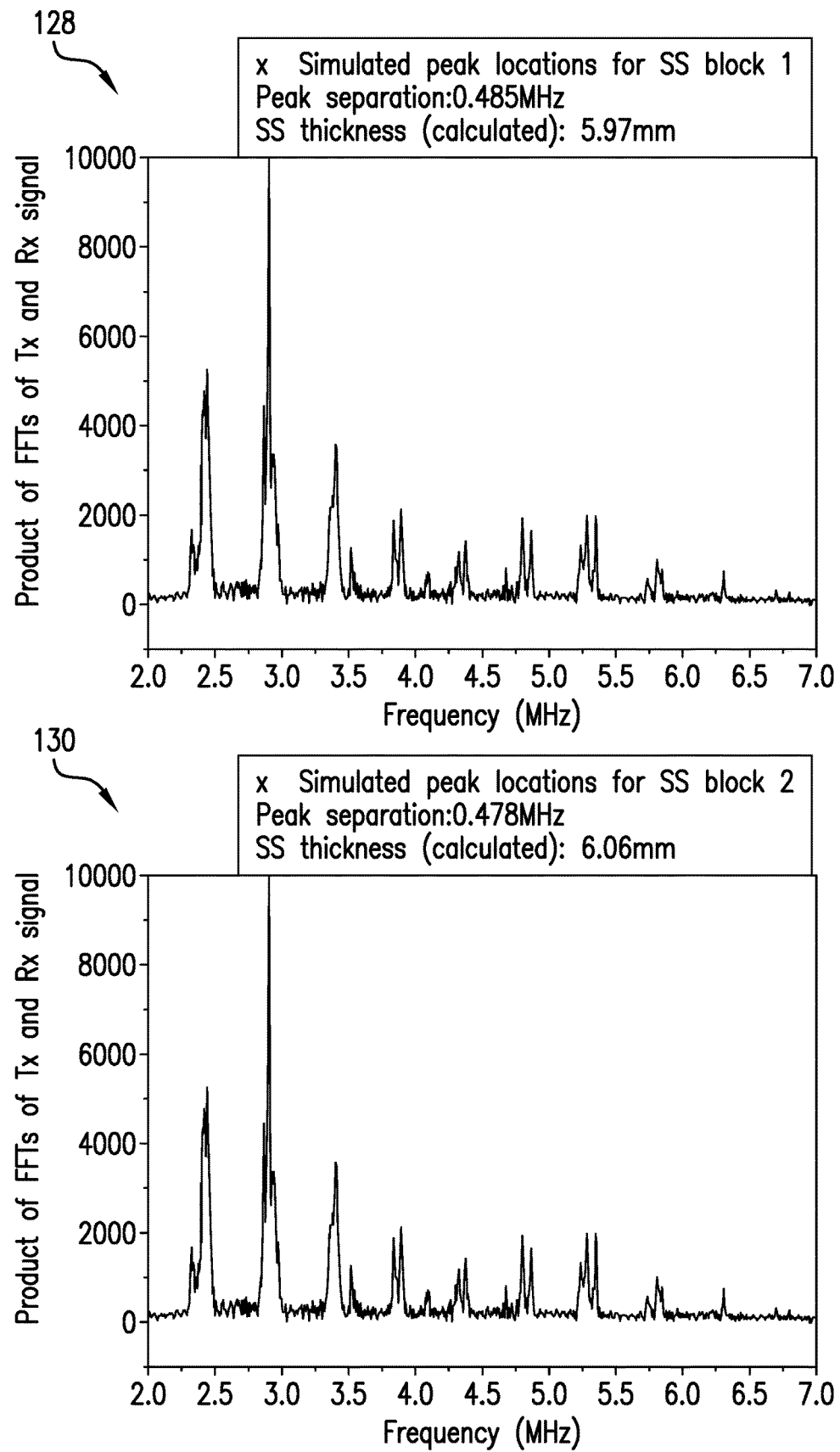
FIG. 8 is an illustrative representation of waveforms for steel layers in the experimental set-up of FIG. 6.
Figure 9:
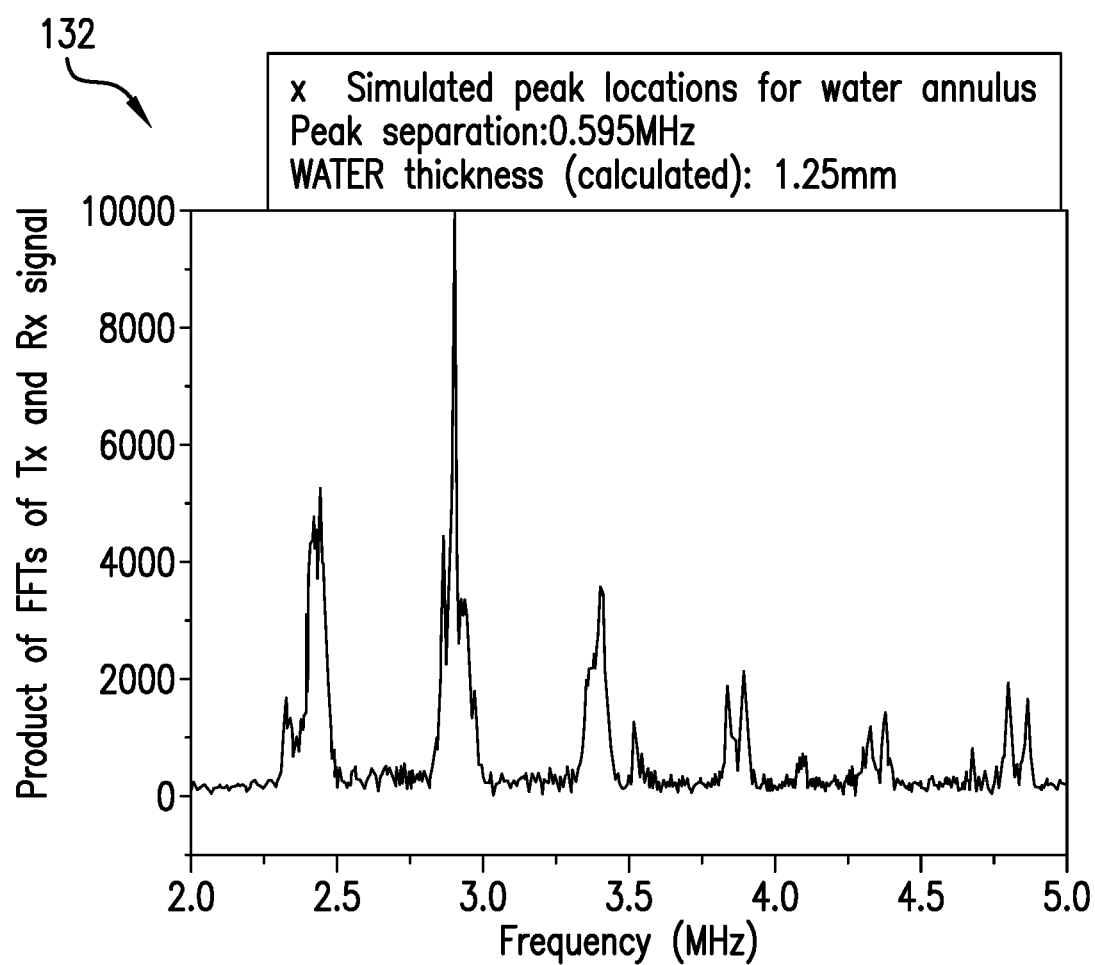
FIG. 9 is an illustrative representation of a waveform for annulus filled with water in the experimental set-up of FIG. 6.

FIG. 8 is an illustrative representation showing waveforms 128 and 130 that are processed for reflected resonances for the steel layers 106 and 108 respectively (also referred as SS (Stainless Steel) block 1 and SS Block 2 respectively in the FIG. 6). The reflected resonances for the steel layer 106 and 108 are resonances for 0.478 Mega Hertz (MHz). The distance between peaks of this resonances is and calculated as 5.97 mm for steel layer 106, and 6.06 mm for steel layer 108. FIG. 9 is a waveform representation 132 that is processed for the water filled annulus layer 110. The reflected resonances for frequency of 0.595 MHz is indicative of presence of water, and the distance between peaks of these resonances is indicative of the diameter of the annulus in which water is present. This distance is calculated as 1.25 mm using the distance between the peaks.

Figure 10:
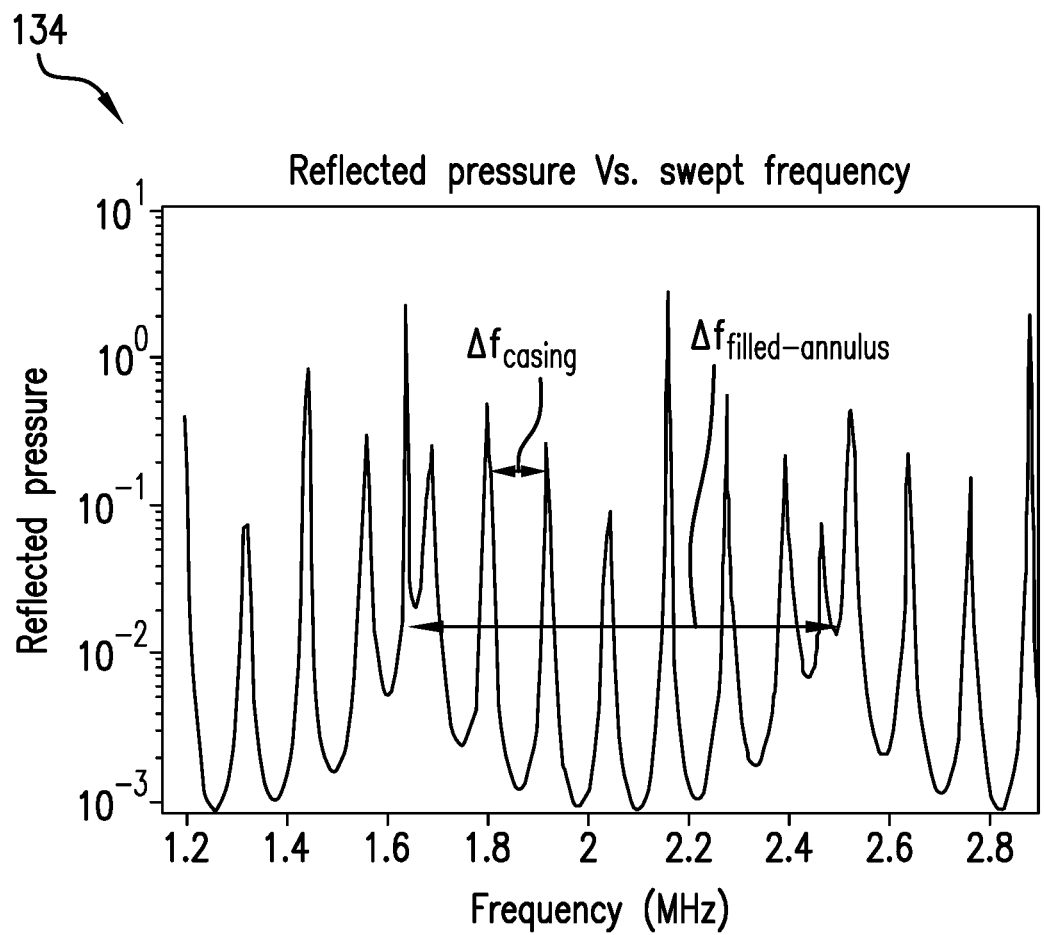
FIG. 10 is a representation of modelled reflected resonances in the resonance model described herein above.

FIG. 10 is a representation of modelled reflected resonances, shown as a graphical output 134 of reflected pressure against swept frequencies in the resonance model described herein above. As seen in FIG. 10, the peaks related to $\Delta f_{casing}$ are indicative of reflected resonances from the steel casing layer, and $\Delta f_{casing}$, as a difference between the consecutive peaks associated with steel casing layer, indicate the thickness of the steel casing layer. Similarly, peaks related to $\Delta f_{filled-annulus}$ are indicative of reflected resonances from the annulus, and $\Delta f_{filled-annulus}$ as a difference between the consecutive peaks associated with annulus, indicate the thickness of the annulus layer.

Figure 11:
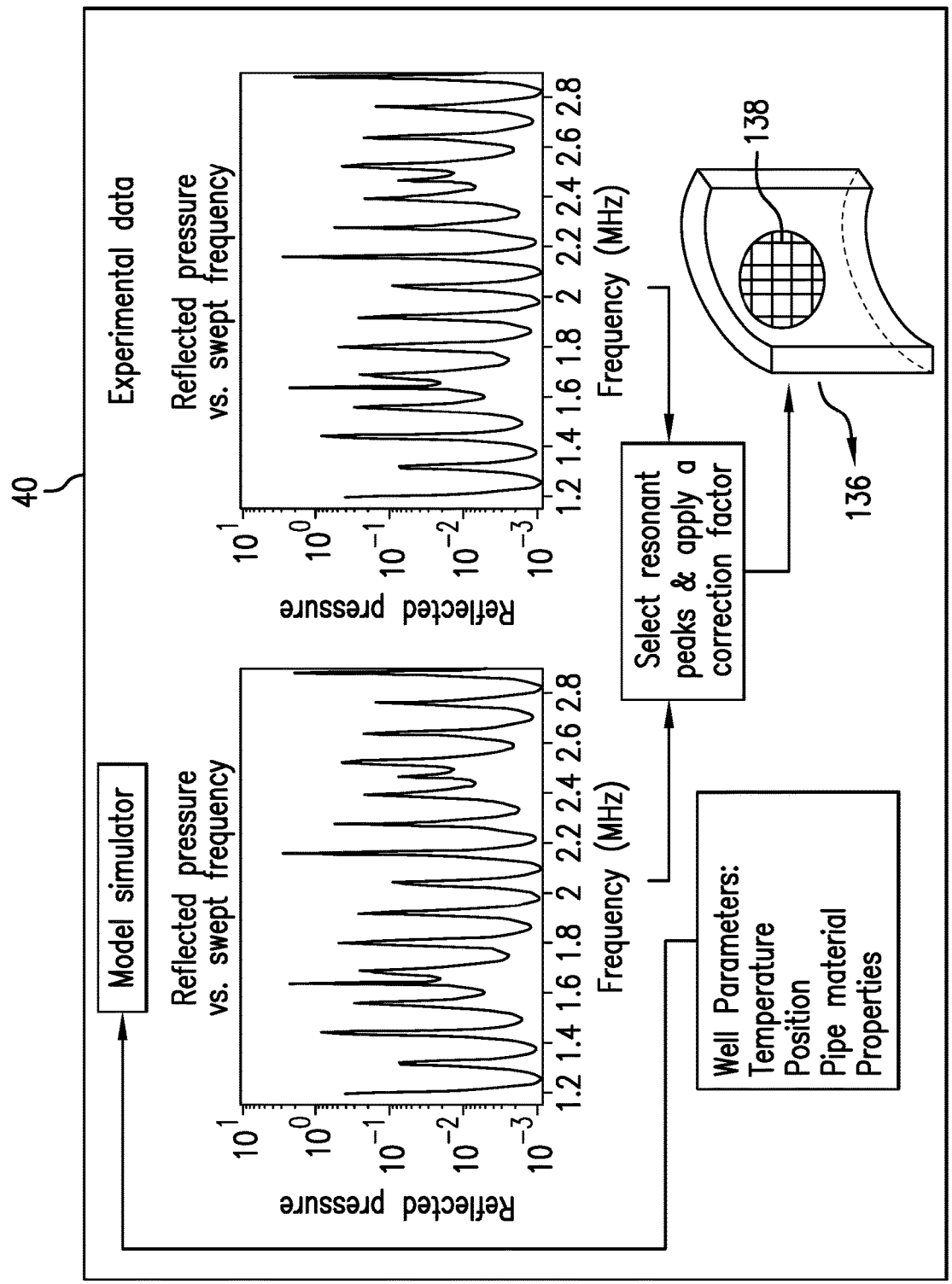
FIG. 11 is a diagrammatic representation of select processing steps performed in the processor of the apparatus of FIG. 4.

FIG. 11 is a diagrammatic representation of processor 60 showing select processing steps to generate a geometry characterization image 136 and annulus dimension 138 described herein above that are obtained as an output of the processor described in reference to FIG. 4.

Figure 12:
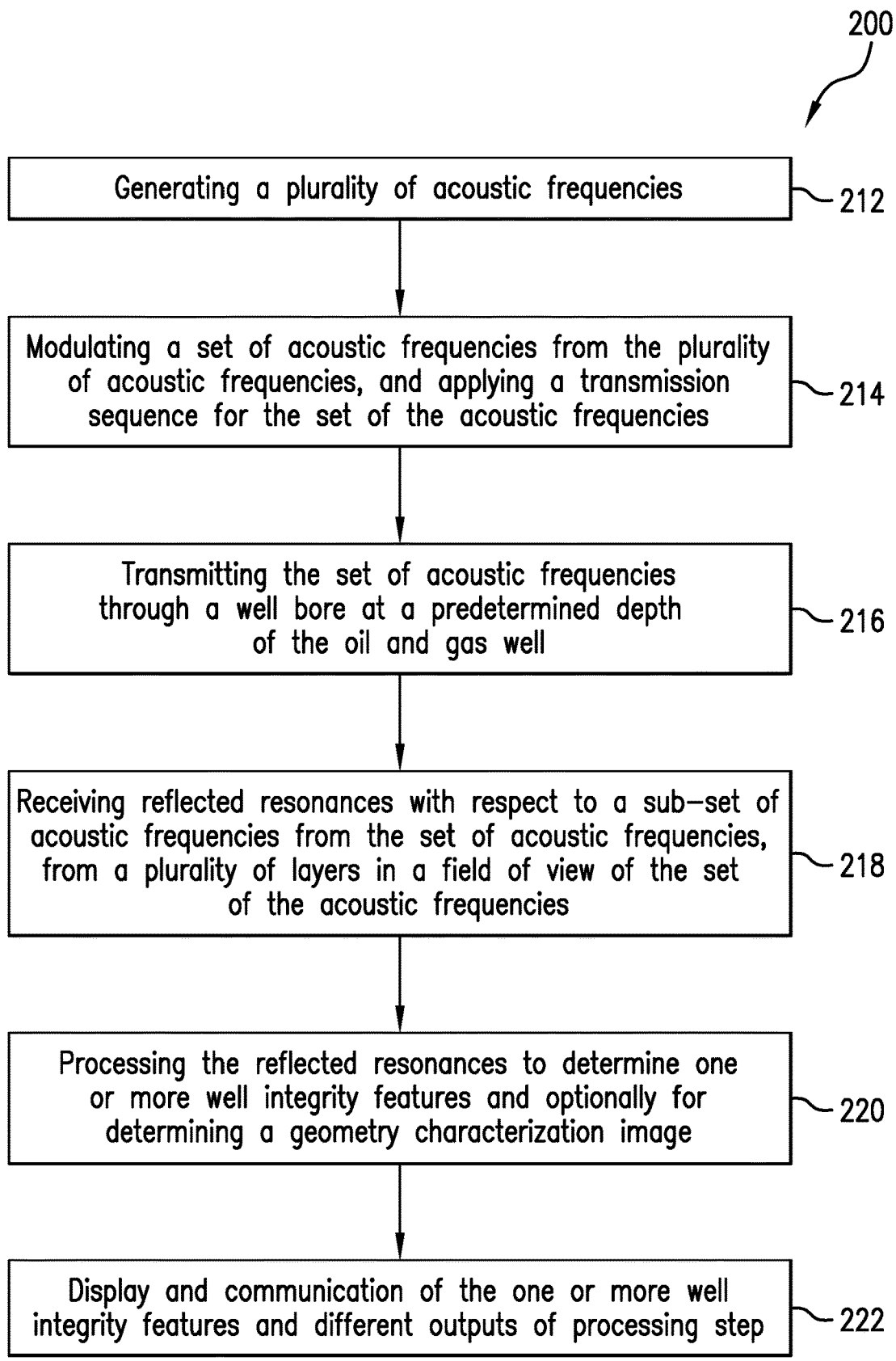
FIG. 12 is a flowchart representation of a method for testing well integrity according to one embodiment.

FIG. 12 is a flowchart representation 200 of a method of inspecting a downhole component or structure. The method 200 is described as being used to inspect a multi-layer or multi-tubular structure but is not so limited. For example, the method 200 may be used to inspect various components, such as nested tubulars, individual pipes or other tubulars, connections between tubulars, etc. In addition, the method 300 (or aspects thereof) may be used to measure or inspect subterranean materials, such as formation materials and/or fluids.

The method includes a step 212 for generating multiple acoustic frequencies. As explained herein above, the acoustic frequencies are derived from a bulk wave having frequencies in the range of about 1-10 Mega Hertz.

The method includes a step 214 for modulating a set of frequencies from the multiple frequencies, for transmitting them in a transmission sequence through well integrity layers, and a step 216 for receiving reflected resonances from different well integrity layers, for at least a subset of acoustic frequencies from the set of transmitted frequencies. The method includes a step 218 for processing the reflected resonances, as described herein above in reference to the exemplary apparatus.

The method further includes a step 220 for determining one or more properties of components and/or materials in a formation. For example, one or more well integrity features may be detected or inspected based on reflected resonances (referred also as output of processing or processor in some embodiments). The method also includes a step 222 for communicating the output of processing step to a display unit. The processor output may be further communicated to an external communicating device for any control and maintenance actions based on the processor output. The different techniques for transmission of multiple frequencies, reception of reflected resonances, and processing of the reflected resonances have already been described in reference to the exemplary apparatus of the invention.

Thus the apparatus and method described herein provide a non-destructive testing method for determining presence or absence of micro-annuli in any of the material layers or in the interfaces of different material layers present at depths of beyond 1000-3000 meters of an oil and gas well, as well as cement de-bonding, and extent of such de-bonding at the well casing and cement interface. The apparatus and method also further includes determining one or more of a thickness of each of the layer, a presence of a micro-annulus, detection of medium or fluid in the annulus, and a thickness of the micro-annulus based on the reflected resonances.

Figure 13:
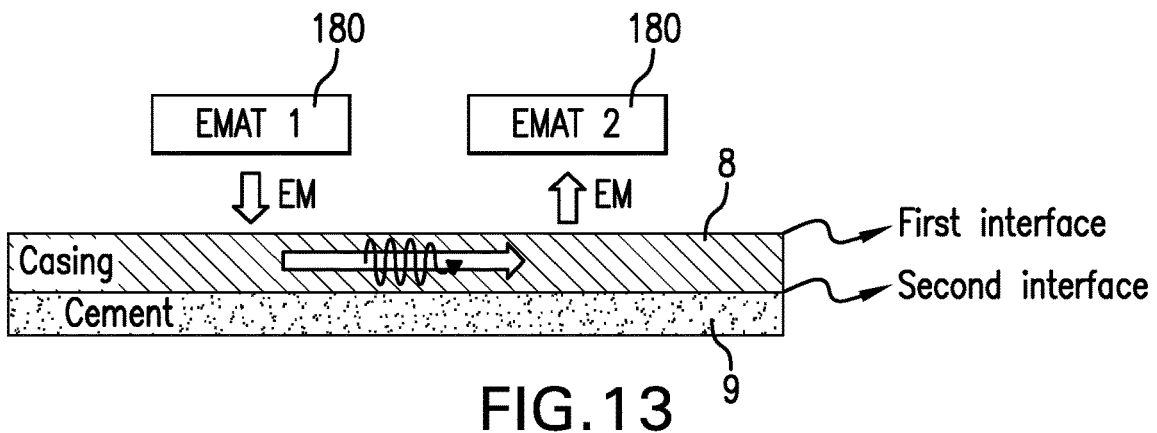
FIG. 13 depicts an embodiment of a sensor device including one or more EMAT transducers, and aspects of a method of inspecting a downhole structure.
Figure 14:
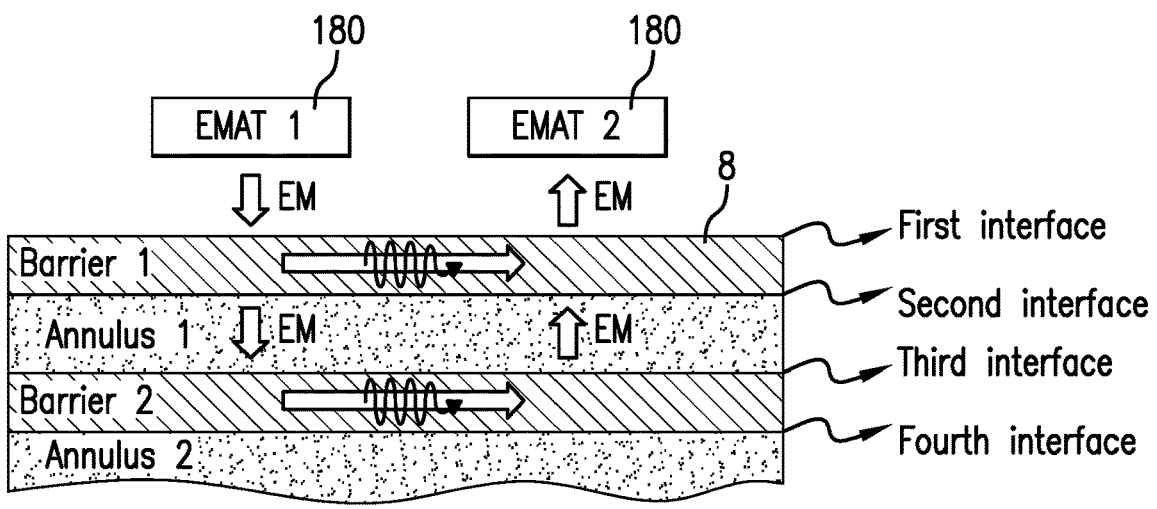
FIG. 14 depicts an embodiment of a sensor device including one or more EMAT transducers, and aspects of a method of inspecting a multi-layer structure having a plurality of conductive layers.
Figure 15:
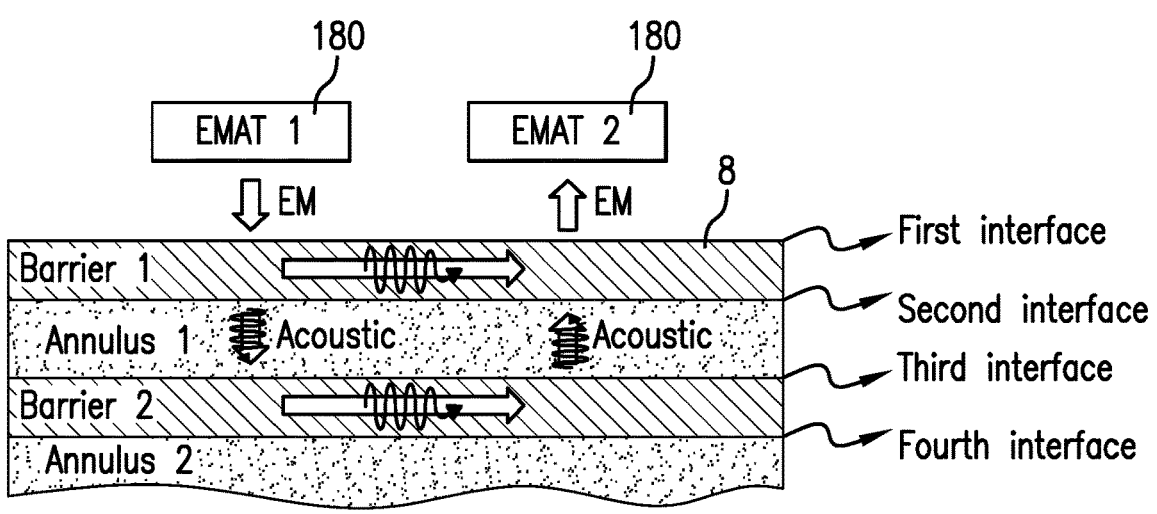
FIG. 15 depicts an embodiment of a sensor device including one or more EMAT transducers, and aspects of a method of inspecting a multi-layer structure having a plurality of conductive layers.

FIGS. 13-15 illustrate various methods of multi-barrier and multi-annular cement inspection, which may encompass all or part of the method 200. In these methods, one or more inspection tools including one or more acoustic sensor devices are deployed in a borehole. The acoustic sensor devices may include, for example, acoustic transducers (e.g., piezoelectric transducers), EMAT transducers or a combination thereof.

The methods of FIGS. 13-15 include generating a plurality of acoustic frequencies, where each acoustic frequency is selected that correlate to reflected resonances associated with specific layers and/or features. The methods further include modulating a set of acoustic frequencies from the plurality of acoustic frequencies, and applying a transmission sequence for the set of acoustic frequencies. The set of acoustic frequencies are transmitted through a borehole at a predetermined depth. Reflected resonances are received from one or more layers in a field of view of the set of the acoustic frequencies, with respect to a sub-set of acoustic frequencies from the set of acoustic frequencies. The reflected resonances are then processed to determine one or more layer features.

The acoustic signals may be chirp or coded frequency ranging from 10 kHz-500 kHz. The received signal can be transformed using FFT or similar signal processing method and matched with modelled multilayer structure for further analysis. The reflected signal from the multilayered structure can be an interferometric signal or can be recorded as EMAT impedance with frequency.

FIG. 13 is a schematic illustration of an inspection method applied to a single conductive layer or tubular, referred to herein as a barrier. In this example, the barrier is a metal layer formed by casing or a liner, such as the casing 8. The EMAT transducers 180, shown as EMAT 1 and EMAT 2, couple to the casing layer electromagnetically as described above, and generated acoustic waves propagate along the casing layer. In this example, EMAT 1 operates in transmission mode, while EMAT 2 operates in the reception mode. Reception mode operates in complete reciprocity to the transmission mode illustrated at FIG. 3.

FIGS. 14 and 15 illustrate two specific modes of energy transfer that can be utilized in the evaluation of multi-barrier and multi-annular cement. FIGS. 14 and 15 show two barrier layers (Barrier 1 and Barrier 2), such as nested casing tubulars, the barriers are separated by annulus layers of cement or other material. For example, a first annulus layer (Annulus 1) is disposed between Barrier 1 and Barrier 2, and another annulus layer (Annulus 2) is disposed behind Barrier 2, i.e., disposed at or near a surface of Barrier 2 (at or near the fourth interface) opposite the surface facing Barrier 1. Although only two barriers and two annulus layers are shown, the method may work for an arbitrary number as permitted by signal to noise considerations. In reality, the energy transfer occurs through combinations of the two modes shown. In these examples, acoustic shear waves are shown that propagate along the second interface and the fourth interface. The Annulus layers may be cement layers or be made from any suitable material (including, e.g., solid materials and/or fluids)

The first mode of transfer is electromagnetic (EM) transfer, in which the EMAT transducers are coupled electromagnetically to both barriers 1 and 2. The second mode of energy transfer is acoustic transfer in which the EM transducers are coupled acoustically to the barrier 2.

In one embodiment, a method of inspecting a multi-layer or multi-tubular structure is performed using an inspection tool or tools having one or more EMAT transducers. In this embodiment, a first set of frequencies is selected based on material properties of the barrier layers, to result in resonances that reflect from the layers (e.g., from the second and fourth interfaces). A second set of frequencies is selected to result in resonances reflected from the annulus layers and/or features (e.g., micro-annuli, voids, spaces etc.) thereof. Properties of the various layers may be determined based on detection and analysis of resonance peaks as discussed above.

In one embodiment, the method includes detecting signals from the first set of frequencies electromagnetically, e.g., via receiver coils in one or more EMAT transducers. In addition, acoustic signals such as those shown in FIG. 15 that are transmitted through the annulus layers are detected acoustically, by the EMAT transducers and/or by one or more acoustic transducers such as piezoelectric transducers. The detected resonances from both modes can be analyzed as discussed above.

In this way, properties of the barriers can be measured electromagnetically (e.g., by detection of currents in Barrier 1), and properties of the annular layers (e.g., cement) can be measured by detecting acoustic signals.

The systems shown in FIG. 14 and FIG. 15 may be sensitive to multiple interfaces of any number. Four interfaces are shown here for illustrative purposes, but there may be more or less. As such, the above method may be used to evaluate Barriers 1, 2 and more for defects, Barriers 1, 2, and more for wall thickness and metal loss, and Annuli 1, 2, and more for cement defects, cement quality, and zonal isolation.

Figure 16:
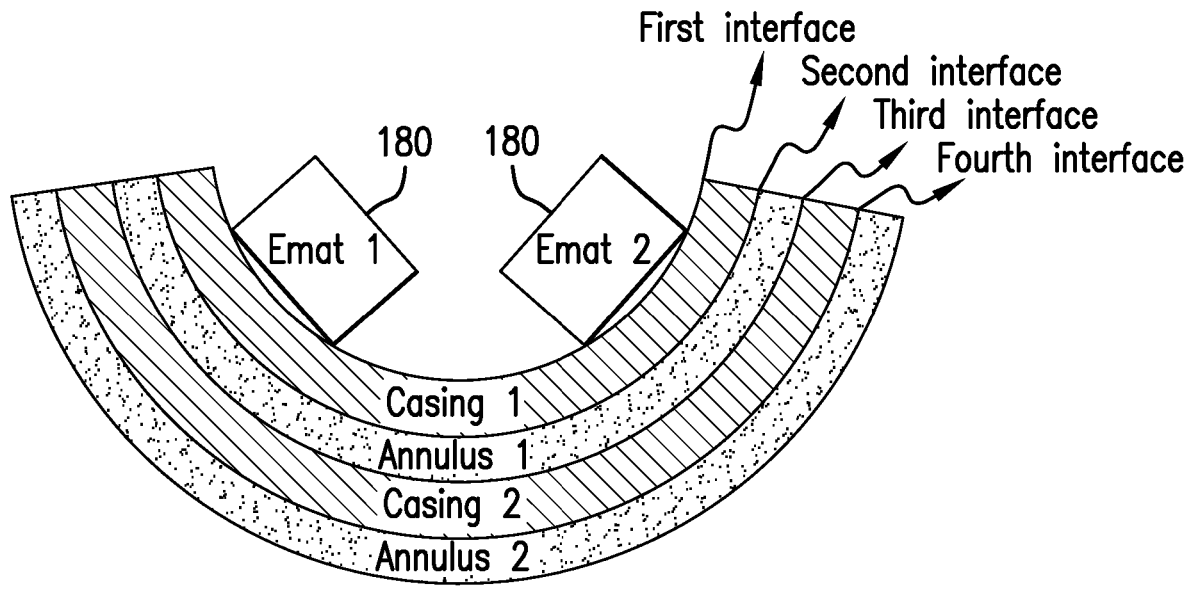
FIG. 16 depicts an embodiment of a sensor device including one or more EMAT transducers, and aspects of a method of inspecting a multi-layer structure having a plurality of conductive tubulars.

FIGS. 13-15 and the above description are for illustrative purposes. A plurality of configurations may be used. These include but are not limited to: using arrays of EMATs for transmission and reception, using the same EMAT for transmission as well as reception, and staggering the EMATs along the circumference of a pipe or other tubular, as shown in FIG. 16. In the example of FIG. 16, the barrier layers are shown as Casing 1 and Casing 2, and the annulus layers are cement layers denoted Annulus 1 and Annulus 2.

Other configurations could include also a three-transducer configuration (i.e. EMAT 1, EMAT 2 and EMAT 3) and even higher order arrays besides a two-transducer sensor configuration (i.e. EMAT 1, EMAT 2). These tool configurations allow the computation of wave propagation delay times, phase and attenuation between the EMAT transducers.

These EMAT sensor arrays can be oriented in two dimensions along the inner surface of a tubular azimuthally or circumferentially (in the plane perpendicular to the tubular longitudinal axis) or longitudinally (along the tubular longitudinal axis) to be sensitive in features and geometries oriented in both directions.

Figure 17:
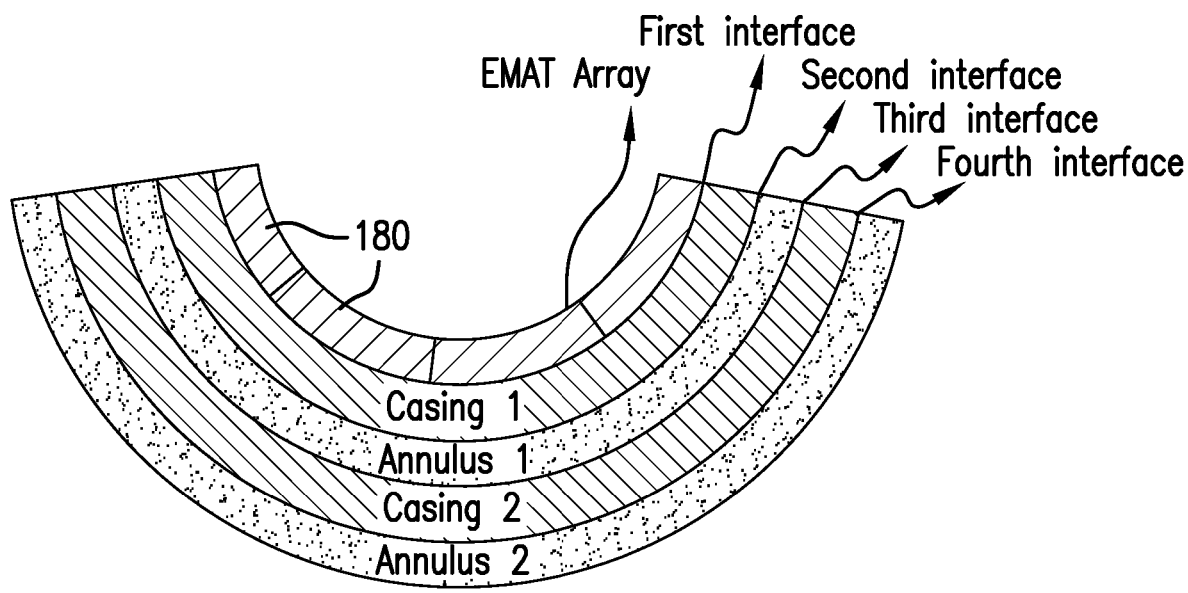
FIG. 17 depicts an embodiment of a sensor device including an array of EMAT transducers, and aspects of a method of inspecting a multi-layer structure having a plurality of conductive tubulars.

The transducers may be arranged in an array to create focusing control or advanced beam forming where the scattering from a medium of interest (e.g., barrier and cement layers) is high. Each EMAT transducer can be used as a transmitter and receiver or one as a transmitter and another as a receiver or vice versa. Each of the EMATs can act as a transmitter or a receiver or vice versa. Two or more EMATs can be group together and energized with a time sequence waveform to create deformable focused acoustic wave to evaluate multilayer structure. One embodiment is shown in FIG. 17.

In one embodiment, the sensor devices and systems described herein are used for inspecting downhole components such as pipes, collars, pipe connections and others. Methods in this embodiment may include selecting frequencies that are associated with reflected resonances from various features, such as pipe or other tubular layers, interfaces between connected components, discontinuities such as cracks, wear or damage, and/or any other features of interest.

For example, methods are provided for inspecting pipe or other tubulars to identify and/or locate a stuck pipe condition. A "stuck pipe" condition is a condition in which a tubular or other component is restricted in its movement.

In a stuck pipe condition, forces are generated that can affect acoustic waves propagating therethrough. When a pipe or other tubular is stuck, there are strong normal forces in the pipe-to-borehole mechanical interface coupling attachment due to interface friction and the pipe often being dug into the borehole wall. When the pipe is stuck, shear type waves (shown, for example, in FIGS. 14 and 15) propagating azimuthally or longitudinally will exhibit attenuation and phase delays alterations compared to a free pipe condition, as the acoustic wave mode energies will leak into the formation rock due to the strong stuck pipe-to-borehole's interface mechanical coupling. The free pipe condition will exhibit comparatively lower attenuation and less phase delay than the stuck pipe condition. Sensor devices having transducers described herein can be used to detect a stuck pipe condition by generating acoustic waves in the pipe using methods described above, and analyzing detected acoustic signals for attenuation and phase characteristics. These characteristics can be used to detect stuck pipe conditions and/or differentiate between stuck pipe and free pipe conditions. It is noted that the term "pipe" is not intended to limit this embodiment to any particular type of tubular or downhole component.

Methods are also provided for detecting discontinuities in a pipe or other tubular component. Discontinuities may be due to defects, cracks, corrosion, erosion, damage to a pipe or connection between pipes, and others.

Figure 18:
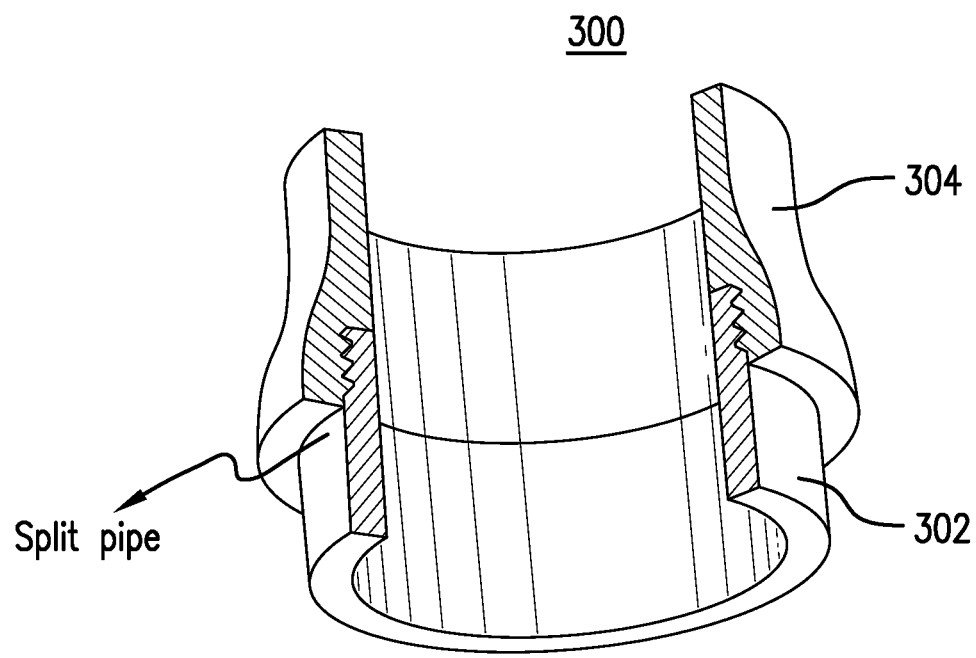
FIG. 18 depicts an example of a downhole structure including a defect in the form of a crack or split.

An example of a discontinuity or defect is a "split pipe" condition. Split pipe conditions generally refer to conditions where there is an undesirable separation between downhole components. FIG. 18 shows an example of a tubular downhole component 300, which includes a pipe 302 or other tubular connected via threads to a pipe collar 304. FIG. 18 also shows an instance of a split pipe condition in which there is a split in the interface between the threads of the collar 304 and the pipe 302.

Figure 19:
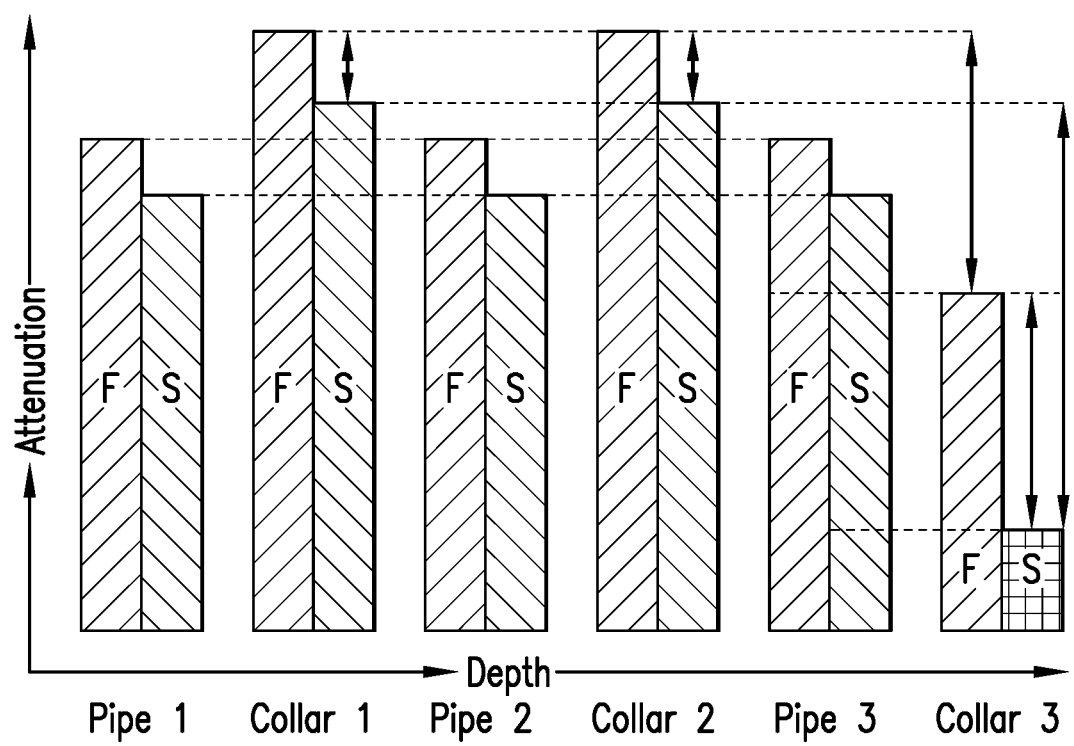
FIG. 19 depicts an example of attenuation measurements taken by a sensor device of various layers of a multi-layer structure.

In this example, an inspection method includes generating acoustic signals in the component 300, and detecting acoustic signals after propagation. In one embodiment, the method includes detecting shear waves and flexural waves and analyzing characteristics of the detected waves to identify a split pipe condition. FIG. 19 depicts levels of flexural and shear attenuation along interfaces between pipe and collar.

For example, a shear or an acoustic wave (with variants and modes such as shear, Lamb, modes M0, M1, M2, etc.) will propagate with a characteristic velocity, phase and attenuation along an outer surface of a tubular such as the pipe 302, if the pipe surface does not have any split, crack, fracture defect, damage or other discontinuity. If a discontinuity is in the path of the wave, the acoustic wave will exhibit a reduced attenuation and a distortion in phase delay, and a velocity reduction, that varies according to frequency. A discontinuity (e.g., the split in FIG. 18) is located in the plane perpendicular to the tubular longitudinal axis and will cause disturbances (attenuation increase, increased phase delay, reduced velocity, etc.) in acoustic waves propagating longitudinally along the pipe.

The split pipe defect or other discontinuity can be along a longitudinal direction in the inner and/or outer cylindrical surface of the tubular and causes disturbances (attenuation decrease) in acoustic waves propagating azimuthally along the inner or outer cylindrical surface of the tubular (pipe) collar threaded joint. In this example, the component 300 can be surveyed from top to bottom and a measurement of the difference in flexural attenuation versus shear attenuation can be recorded by depth. A change of both flexural and shear to its previous depth value is also recorded. These changes combined will be constant across all pipe and collar sections of similar sizes. When a crack or split pipe is encountered, there will be a considerable difference between the good pipe section and the damaged pipe. This is due to the Shear not being able to transmit across the crack or split and having a considerable drop in attenuation. Meanwhile the Flexural wave magnitude will drop, but not as much as the shear because it is able to jump the crack or split. This results in a larger difference between the Shear and Flexural attenuation, as shown for example in FIG. 19. These differences can be detected to identify, locate and estimate properties (e.g., width, extent) of the split pipe defect or other discontinuity.

Figure 20:
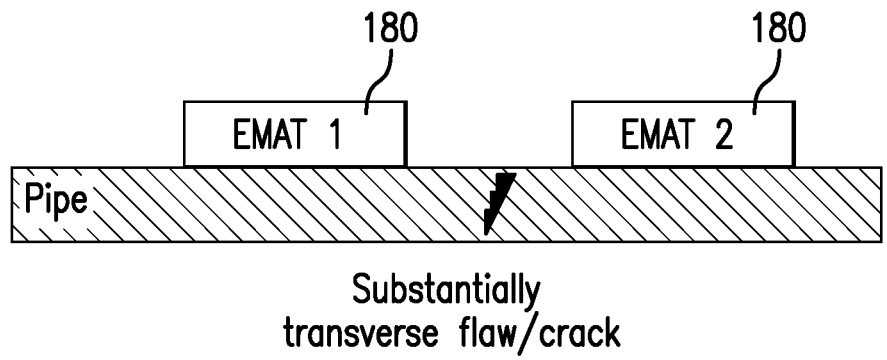
FIG. 20 depicts an example of a sensor device configuration for detection of transverse cracks, flaws, defects and/or other discontinuities.
Figure 21:
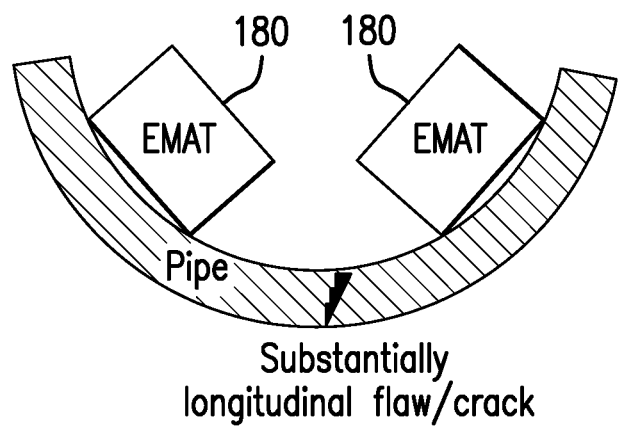
FIG. 21 depicts an example of a sensor device configuration for detection of longitudinal cracks, flaws, defects and/or other discontinuities.

FIGS. 20 and 21 show examples of configurations for detecting different types of flaws or discontinuities. FIG. 20 shows a configuration detecting transverse flaws/cracks, in which a first EMAT transducer and a transducer are arrayed in the longitudinal axis of the pipe. FIG. 21 shows a configuration for detection of longitudinal cracks in which the transducers are arrayed in a transverse or azimuthal direction.

Figure 22:
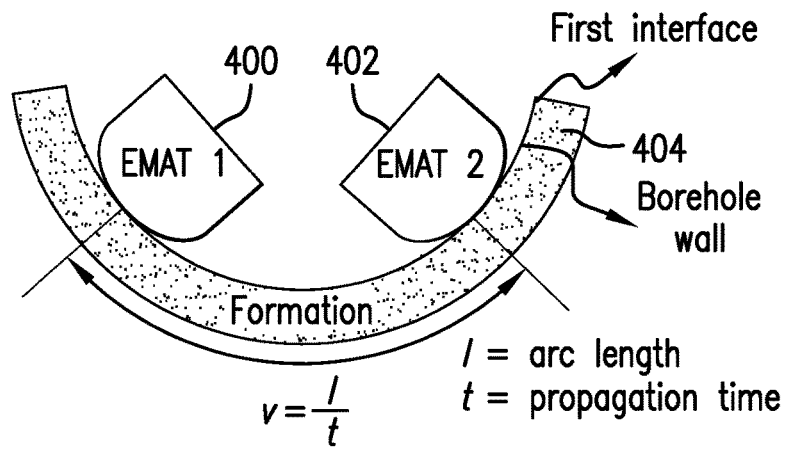
FIG. 22 depicts an embodiment of a sensor device having one or more sensor pads configured to be disposed proximate to a surface of an open hole section of a borehole, the one or more sensor pads including one or more EMAT transducers.
Figure 23:
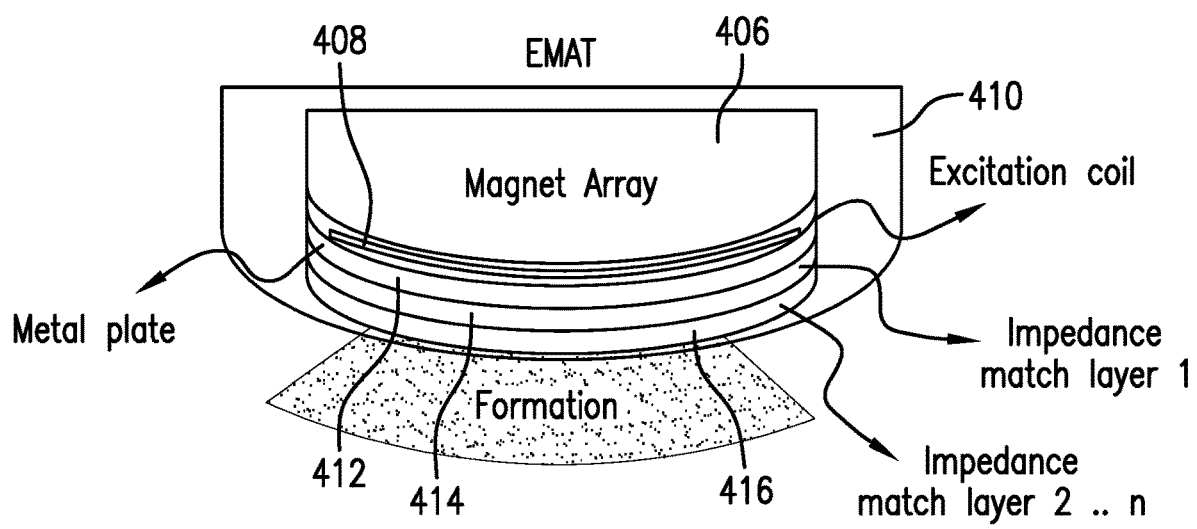
FIG. 23 depicts an embodiment of a sensor pad of FIG. 22, which includes a plurality of impedance matching layers.
Figure 24:
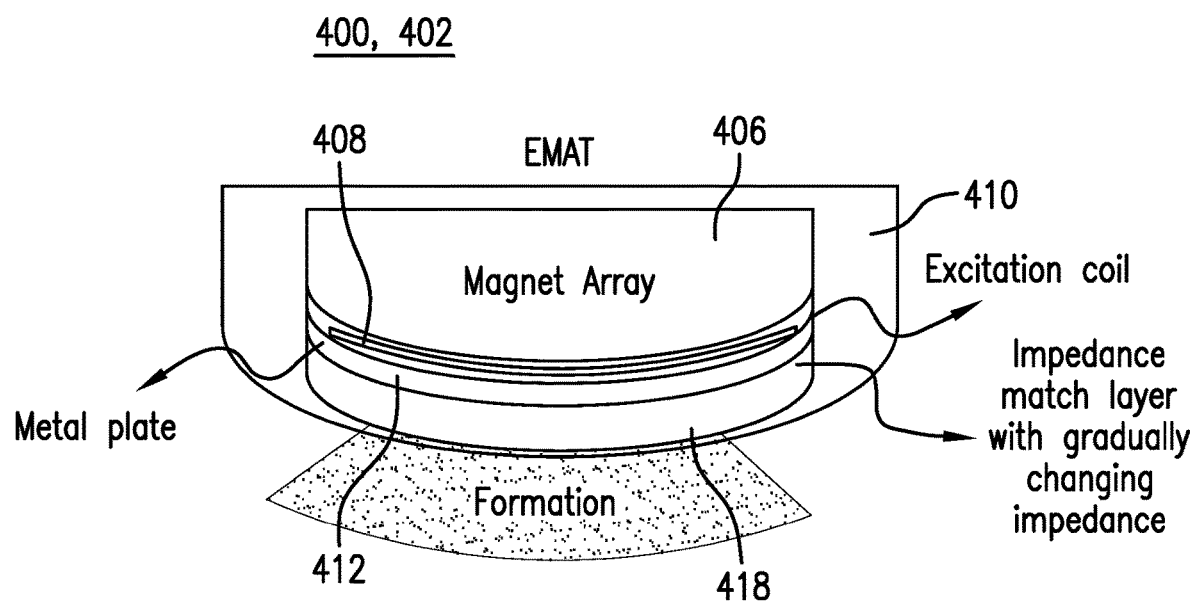
FIG. 24 depicts an embodiment of a sensor pad of FIG. 22, which includes an impedance matching material having gradually changing impedance values.

FIGS. 22-24 illustrate embodiments of a method of estimating properties of a subterranean region such as a formation, which utilize acoustic sensing devices described herein. In these embodiments, a sensor device such as the inspection tool 170 is configured to be deployed in an open hole section of a borehole and perform measurements directly of formation materials through an uncased borehole wall.

The sensor device, in one embodiment, includes multiple sensor pads arrayed along a selected direction (e.g., azimuthal and/or longitudinal) and positioned in contact with an uncased borehole wall. For example, the sensor device includes at least a first sensor pad 400 having an acoustic transducer disposed therein, and a second sensor pad 402. The pads 400 and 402 are both disposed in contact with (or at least proximate to) a surface of a borehole wall 404. The pads 400 and 403 may be connected to an outer surface of an inspection tool, or connected to extendable arms.

In this example, the pads 400 and 402 are arrayed azimuthally and separated by a distance corresponding to an arc length distance l between the pads along the borehole surface. The distance l, with the arrival propagation time t, are used to determine the acoustic wave velocity v. One of the pads induces various acoustic wave modes (e.g., Compression, shear, lamb, with modes M0, M1, M2 etc.) which can travel along the borehole wall. This method's measurements of time (t) and distance (l) via a can be used for computation of compression and shear wave velocities in the borehole wall. Although the pads 400 and 402 are shown as being arrayed azimuthally or transversely, they can be arrayed along any desired direction (e.g., longitudinally).

In one embodiment, the pads 400 and 402 are operated to induce acoustic waves and detect acoustic signals, and compute acoustic wave velocities in a 2-D surface map along the borehole surface, which can be used for geomechanic and other applications. The EMAT array pad arrangements can measure two-dimensionally in the borehole surface along the longitudinal and/or azimuthal directions. In addition, these arrangements can be used for acoustic anisotropy and fracture analysis survey interpretation with a 3D model of the borehole surface interval for a 3D reservoir level studies integration.

FIGS. 23 and 24 depict examples of an acoustic transducer pad such as the pad 400 or 402. The pad can be used as a transmitter, receiver or both. In these examples, the pad includes a magnetic array 406, an excitation coil 408, and a housing 410 that includes a metal cover plate 412. Typically, the metal cover plate 412 (made of, e.g., steel or Inconel) is very thin (~0.005 to 0.010 inch thick).

The pad includes at least one acoustic impedance matching material to allow acoustic energy coupling into the formation and signal returns from the formation, while also serving as wear protection against formation erosion and abrasion damages to the sensor. The impedance matching material may include one or more layers of material (which may have varying levels of impedance).

The purpose of the impedance matching material is to maximize the transmission or reception of acoustic energy by a transducer by employing acoustic impedance matching. The impedance matching material may have an acoustic impedance that matches (or is within a selected range) the acoustic impedance of the sensing face at the transducer end of the matching material and another acoustic impedance at the end contacting or in close proximity to the borehole wall through which acoustic energy is transmitted or from which it is received. The other acoustic impedance matches or is within a selected range of the acoustic impedance of the tubular. In non-limiting embodiments, an acoustic impedance transition section from one end to the other end transitions the acoustic impedance of the matching material by one or more steps having intermediate acoustic impedance values or the acoustic impedance transition can be a smooth continuous transition or the acoustic impedance transition can be some combination of the foregoing.

An example of selecting the acoustic impedance matching material for a piezoelectric acoustic transducer in contact with or in proximity to a borehole wall includes calculating the acoustic impedance as follows:

Acoustic Impedance of Material=Density of Material×Speed of Sound in Material

Acoustic Impedance of formation=Density of formation×Speed of Sound in the formation.

For example, as shown in FIG. 23, an impedance matching layer 414 is provided to serve as a wave guide or carrier. The matching layer 414 is a metallic material configured to generate stronger Lorentz forces and acoustic waves. Metallic materials, like titanium, or aluminum, having less acoustic impedance than the thin inner cover plate (typically steel, or Inconel), are preferred to use. The matching layer 414 may be of a quarter ¼th, or ⅛th of the wavelength at the propagating wave center frequency, and may be bonded to the cover plate, or separated apart from the inner cover plate with a fixed very small gap (liftoff). If used as a single impedance matching layer, the matching layer 414 may serve as a metallic pad (curved surface) that is placed in contact with the borehole wall.

Additional matching layers may be included to allow better acoustic coupling to the formation. For example, an outer impedance matching layer 416 may be disposed on the matching layer 414 (e.g., a non-metallic layer) and configured to be in contact with the formation (either directly or via the housing). For example, the outer matching layer 416 can be an outer wear plate or pad that contacts the formation. An exemplary acoustic p-wave impedance of this wear plate is in the range of 3-8 MRayls, similar to those of typical formations to provide optimal acoustic coupling. Materials that can be used to make up the outer matching layer include be high-temperature (HT) thermal plastics, or additional erosion/wear resistance, HT thermal plastics composites mixed with metal powder or mixed with ceramics, or high-temperature epoxy mixed with metal powers with varying distributions.

Several candidate composites for the wear pad, with good impedance matching and good erosion/abrasion resistance, are given below with lab measured properties, PEEK filled with 30 wt % ceramic (density 1.623 g/cc, p-wave velocity 2557 m/s, impedance 4.15 MRayls); PEEK filled with 30% glass fiber (density 1.54 g/cc; p-wave velocity 2850 m/s; shear velocity 2015 m/s); PTFE (Teflon) filled with 40 wt % of steel power (density 3.23 g/cc, p-wave velocity 1298 m/s, and impedance 4.19 MRayls); PTFE (Teflon) filled with 23 wt % carbon and 2 wt % graphite (density 2.169 m/s; p-wave velocity 1438 m/s, impedance 3.12 MRayls). The above PTFE-based composites may be preferred for compressional and shear wave coupling between the metallic inner matching to soft (acoustically slow) formation loads. The above PEEK-based composite as the outer impedance match and wear plate, is more suitable for hard (acoustically fast) formation loads.

In one embodiment, the impedance matching material may be a single layer or multiple layers that exhibit a gradually changing impedance value (e.g., in a direction normal to the borehole wall surface). For example, as shown in FIG. 24, an impedance matching layer 418 having a gradually changing impedance value may be included. This matching layer is made from, for example, an epoxy composite filled with metal powders in variable distribution or gradient impedance. One example is an epoxy composite filled with titanium powders. Note that the impedance gradient composite may be also used as the outer wear pad. The titanium powders are distributed in a gradient with length. A lab sample composite (~22 mm long) was made. At one end the titanium concentration is high (acoustic impedance is about 13 MRayls), and the other end is almost pure epoxy (acoustic impedance about 3.0 MRayls). The average properties measured for this 22-mm composite were density 1.499 g/cc, p-wave velocity 3413 m/s, and impedance 5.12 MRayls. The distribution gradient of metal powders in epoxy composite may be designed and cut to allow optimum impedance matching between the inner metallic wave carrier pad and the formation load. The composite length may be ¼th or ⅛th (more preferred) of the wavelength at the propagation wave (shear, compressional, or Lamb) center frequency.

The sensor devices and methods may be used for various open hole acoustic logging measurements, such as: velocity of compressional wave generated and/or measured by EMATs; and velocity of shear/Lamb wave generated and/or measured by EMATs.

Acoustic propagation wave velocities along with formation volumetric density measurements (i.e. g/cc) can be used to estimate dynamic rock mechanical properties such as Young's Modulus (Y), Bulk Modulus (K), Shear Modulus ($\mu$) and Poisson's Ratio ($\sigma$).

The EMAT pads and density open hole measurements can be made with pad devices deployed with arms in the same azimuthally keyed logging tool string including at least a density tool, an orientation and accelerometer tool, multi-arm caliper tool, borehole image tool and an orientation tool. The EMAT open hole pad technology and complementing tool string measurements listed above can be applied to rock fracture detection, characterization and evaluation. Fractures can affect acoustic anisotropy log data. Both EMAT and density pad technology tools have measurements with higher vertical resolution in the order of one to two inches to combine with borehole image analysis. Therefore, the mechanical properties computations based on EMAT sonic log data can be obtained from measurements taken from the same borehole wall volumes and be precisely assigned to the same well depth and oriented azimuth zone location.

Formation rock mechanical property evaluation (Refer. 10) can be made with measurements from an open hole tool string such as an azimuthally keyed logging tool string including a density tool, an orientation tool, multi-arm caliper tool, borehole image tool and an orientation tool. Keyed pad measurement arrays with azimuthal and longitudinal orientations may be used. All of the various borehole wall measurements can be represented in a two-dimension surface map with oriented azimuthal and longitudinal acoustic velocity distributions represented along the borehole wall with respective computed dynamic mechanical properties. This surface map allows for Geo-mechanical analysis and evaluation of rock stresses and forces acting within a reservoir crossed by this borehole wall. The reservoir's principal stress orientation estimated along the borehole and other reservoir boreholes provides important insight for reservoir development involving well placement, drilling, completion design, production stimulation and drive, etc. In a vertical well shale and other laminar bedding will exhibit Vertically Transverse Isotropy (VTI) and similarly with respect to a horizontal well this same laminar bedding will show instead Horizontal Transverse Isotropy (HTI). Formation rock stress-strain relationships evaluated with the corresponding rock stiffness matrix allow better understanding of rock behavior and properties. In a rock formation exhibiting VTI, there are five unknown stiffness coefficients that cannot be solved by two sonic logging derived rock properties plus density data alone. Geo-mechanical analysis is important for reservoir development decisions and problem solving.

Well cementing inspection is imperative to ensure that adequate zonal isolation has been provided by the cement between the casing and the formation of an oil or gas well. Failure can lead to severe environmental and economic consequences. Various acoustic techniques have been developed over the years to inspect the casing as well as the cement behind the casing. Low frequency acoustic measurements, such as the Cement Bond Log/Variable Density Log (CBL/VDL) operate around 20 kHz have been around for forty years and provide inexpensive diagnosis. Ultrasonic pulse-echo and pitch-catch measurements operate in the hundreds of kiloHertz range and investigate the casing and the entire cement cross-section behind casing. CBL and pulse-echo measurements use attenuation of compressional waves to compute apparent cement impedance, or to derive compressive strength. These methods use acoustic/ultrasonic transducers which need a fluid for coupling to the casing. Embodiments described herein, utilizing EMAT transducers, have the significant benefit over conventional transducers that they do not need fluid coupling.

Set forth below are some embodiments of the foregoing disclosure:

Embodiment 1: A method of inspecting a nested multi-layer structure disposed in a borehole, the method comprising: deploying a sensor device including an electromagnetic acoustic transducer to a location in the borehole proximate to the multi-layer structure, the multi-layer structure including at least a first electrically conductive layer, a second electrically conductive layer, and a third layer disposed behind the second conductive layer; generating a drive signal including a plurality of frequencies selected based on physical properties of the multi-layer structure; applying an electrical current signal to the sensor device based on the drive signal, the electrical current signal inducing currents in the first conductive layer, the induced currents generating acoustic signals having the plurality of frequencies in the multi-tubular structure; detecting a first set of resonant frequencies based on electromagnetic signals received at the transducer; detecting a second set of resonant frequencies based on acoustic signals received from the multi-layer structure; and estimating a property of at least one of the first conductive layer and the second conductive layer based on the first set of resonant frequencies, and estimating a property of the third layer based on the second set of resonant frequencies.

Embodiment 2: The method as in any prior embodiment, wherein the electromagnetic signals are detected by the electromagnetic acoustic transducer, and the acoustic signals are detected by an acoustic transducer or the electromagnetic acoustic transducer.

Embodiment 3: The method as in any prior embodiment, wherein the acoustic signals are detected by a piezoelectric transducer.

Embodiment 4: The method as in any prior embodiment, wherein the first layer and the second layer are formed by tubular components and the third layer is a cement layer.

Embodiment 5: The method as in any prior embodiment, wherein the sensor device includes a first electromagnetic acoustic transducer and a second electromagnetic acoustic transducer disposed proximate to a surface of the first conductive layer, the first conductive layer being a radially innermost layer, and first and second electromagnetic acoustic transducers separated by a selected azimuthal distance.

Embodiment 6: The method as in any prior embodiment, wherein one of the first electromagnetic acoustic transducer and the second electromagnetic acoustic transducer is configured as a transmitter, and another of the first electromagnetic acoustic transducer and the second electromagnetic acoustic transducer is configured as a receiver.

Embodiment 7: The method as in any prior embodiment, wherein the sensor device includes a plurality of electromagnetic acoustic transducers arrayed transversely along a surface of the multi-layer structure, the plurality of electromagnetic acoustic transducers configured to be actuated according to a time sequence waveform to generate directionally focused acoustic signals.

Embodiment 8: A method of inspecting a downhole component, the downhole component including an electrically conductive tubular structure, the method comprising: generating a drive signal including a plurality of frequencies selected based on physical properties of the tubular structure; applying an electrical current signal to the sensor device based on the drive signal, the electrical current signal inducing currents in the tubular structure, the induced currents generating acoustic signals having the plurality of frequencies in the tubular structure; detecting a set of resonant frequencies based on detection of received signals, the received signals associated with reflections of the acoustic signals; and analyzing the set of resonant frequencies, and determining whether a defect is present in the tubular structure.

Embodiment 9: The method as in any prior embodiment, wherein analyzing the set of resonant frequencies includes estimating at least one of an attenuation of the received signals and a phase delay of the received signals.

Embodiment 10: The method as in any prior embodiment, wherein determining whether the defect exists includes identifying the defect based on the at least one of the attenuation and the phase delay being above a selected threshold.

Embodiment 11: The method as in any prior embodiment, wherein the defect is a stuck pipe condition.

Embodiment 12: The method as in any prior embodiment, wherein the defect is a separation between connected downhole tubular components.

Embodiment 13: The method as in any prior embodiment, wherein the defect is identified based on measuring magnitudes of flexural and shear waves, and comparing a change in the flexural wave magnitudes and to a change in the shear wave magnitudes.

Embodiment 14: A method of evaluating a subterranean region surrounding a borehole, the method comprising: deploying a sensor device including an electromagnetic acoustic transducer to a location proximate to a surface of an open hole section of the borehole; generating a drive signal including a plurality of frequencies selected based on physical properties of a subterranean region adjacent to the borehole; applying an electrical current signal to the electromagnetic acoustic transducer to generate an acoustic signal at a first location in the region, the acoustic signal propagating in a direction along the surface of the open hole section to a second location; detecting the acoustic signal at the second location; and estimating a property of the region based on the detected acoustic signal.

Embodiment 15: The method as in any prior embodiment, wherein the sensor device includes a pad assembly having a conductive outer layer configured to be positioned proximate to the surface, and a magnetic device disposed therein.

Embodiment 16: The method as in any prior embodiment, wherein the pad assembly includes an acoustic impedance matching material disposed between the magnetic device and the outer layer.

Embodiment 17: The method as in any prior embodiment, wherein the acoustic impedance matching material includes a plurality of impedance matching layers, each impedance matching layer having a different impedance matching value.

Embodiment 18: The method as in any prior embodiment, wherein the acoustic impedance matching material exhibits a gradually changing impedance value.

Embodiment 19: The method as in any prior embodiment, wherein estimating the property includes estimating an acoustic wave velocity of the acoustic signal.

Embodiment 20: The method as in any prior embodiment, wherein the sensor device includes a first pad assembly disposed at the first location, the first pad assembly including an electromagnetic acoustic transducer, and a second pad assembly at the second location, the second pad assembly having an acoustic receiver.

In support of the teachings herein, various analysis components may be used, including a digital and/or an analog system. For example, the system 1 and/or apparatus 30 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention.

Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of inspecting a nested multi-layer structure disposed in a borehole, the method comprising:
deploying a sensor device including an electromagnetic acoustic transducer to a location in the borehole proximate to the multi-layer structure, the multi-layer structure including at least a first electrically conductive layer, a second electrically conductive layer, and a third layer disposed behind the second conductive layer;
generating a drive signal including a plurality of frequencies selected based on physical properties of the multi-layer structure;
applying an electrical current signal to the sensor device based on the drive signal, the electrical current signal inducing currents in the first conductive layer, the induced currents generating acoustic signals having the plurality of frequencies in the multi-tubular structure;
detecting a first set of resonant frequencies based on electromagnetic signals received at the transducer;
detecting a second set of resonant frequencies based on acoustic signals received from the multi-layer structure; and
estimating a property of at least one of the first conductive layer and the second conductive layer based on the first set of resonant frequencies, and estimating a property of the third layer based on the second set of resonant frequencies.

2. The method of claim 1, wherein the electromagnetic signals are detected by the electromagnetic acoustic transducer, and the acoustic signals are detected by an acoustic transducer or the electromagnetic acoustic transducer.

3. The method of claim 2, wherein the acoustic signals are detected by a piezoelectric transducer.

4. The method of claim 1, wherein the first layer and the second layer are formed by tubular components and the third layer is a cement layer.

5. The method of claim 1, wherein the sensor device includes a first electromagnetic acoustic transducer and a second electromagnetic acoustic transducer disposed proximate to a surface of the first conductive layer, the first conductive layer being a radially innermost layer, and first and second electromagnetic acoustic transducers separated by a selected azimuthal distance.

6. The method of claim 1, wherein one of the first electromagnetic acoustic transducer and the second electromagnetic acoustic transducer is configured as a transmitter, and another of the first electromagnetic acoustic transducer and the second electromagnetic acoustic transducer is configured as a receiver.

7. The method of claim 1, wherein the sensor device includes a plurality of electromagnetic acoustic transducers arrayed transversely along a surface of the multi-layer structure, the plurality of electromagnetic acoustic transducers configured to be actuated according to a time sequence waveform to generate directionally focused acoustic signals.

8. A method of inspecting a downhole component, the downhole component including an electrically conductive tubular structure, the method comprising:
    generating a drive signal including a plurality of frequencies selected based on physical properties of the tubular structure;
    applying an electrical current signal to a sensor device based on the drive signal, the sensor device including an electromagnetic acoustic transducer disposed proximate to the tubular structure, the electrical current signal inducing currents in the tubular structure, the induced currents generating acoustic signals that propagate through the tubular structure, the acoustic signals having the plurality of frequencies in the tubular structure;
    detecting a set of resonant frequencies based on detection of received signals, the received signals associated with reflections of the acoustic signals; and
    analyzing the set of resonant frequencies, and determining whether a defect is present in the tubular structure.

9. The method of claim 8, wherein analyzing the set of resonant frequencies includes estimating at least one of an attenuation of the received signals and a phase delay of the received signals.

10. The method of claim 9, wherein determining whether the defect exists includes identifying the defect based on the at least one of the attenuation and the phase delay being above a selected threshold.

11. The method of claim 10, wherein the defect is a stuck pipe condition.

12. The method of claim 10, wherein the defect is a separation between connected downhole tubular components.

13. The method of claim 8, wherein the defect is identified based on measuring magnitudes of flexural and shear waves, and comparing a change in the flexural wave magnitudes and to a change in the shear wave magnitudes.

14. A method of evaluating a subterranean region surrounding a borehole, the method comprising:
    deploying a sensor device including an electromagnetic acoustic transducer to a location proximate to a surface of an open hole section of the borehole;
    generating a drive signal including a plurality of frequencies selected based on physical properties of a subterranean region adjacent to the borehole;
    applying an electrical current signal to the electromagnetic acoustic transducer to generate an acoustic signal at a first location in the region, the acoustic signal propagating in a direction along the surface of the open hole section to a second location;
    detecting the acoustic signal at the second location; and
    estimating a property of the region based on the detected acoustic signal.

15. The method of claim 14, wherein the sensor device includes a pad assembly having a conductive outer layer configured to be positioned proximate to the surface, and a magnetic device disposed therein.

16. The method of claim 15, wherein the pad assembly includes an acoustic impedance matching material disposed between the magnetic device and the outer layer.

17. The method of claim 16, wherein the acoustic impedance matching material includes a plurality of impedance matching layers, each impedance matching layer having a different impedance matching value.

18. The method of claim 16, wherein the acoustic impedance matching material exhibits a gradually changing impedance value.

19. The method of claim 14, wherein estimating the property includes estimating an acoustic wave velocity of the acoustic signal.

20. The method of claim 14, wherein the sensor device includes a first pad assembly disposed at the first location, the first pad assembly including an electromagnetic acoustic transducer, and a second pad assembly at the second location, the second pad assembly having an acoustic receiver.

* * * * *